United States Patent
Kim et al.

(10) Patent No.: US 10,852,944 B2
(45) Date of Patent: Dec. 1, 2020

(54) METHOD FOR DISPLAYING SOFT KEY AND ELECTRONIC DEVICE THEREOF

(71) Applicant: Samsung Electronics Co., Ltd., Suwon-si (KR)

(72) Inventors: Chang-Hwan Kim, Seoul (KR); Jeong-Won Ko, Seoul (KR); Joong-Hun Kwon, Seoul (KR); Sangdeuk Nam, Suwon-si (KR); Seung Wook Nam, Bucheon-si (KR); Myoung-Soo Park, Hwaseong-si (KR); Sunyoung Park, Seoul (KR); Kyungjun Lee, Suwon-si (KR); Dong Oh Lee, Seongnam-si (KR); Junwon Jung, Seoul (KR); Huichul Yang, Yongin-si (KR); Hyunyeul Lee, Seoul (KR); Soojin Jeong Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 15/702,305

(22) Filed: Sep. 12, 2017

(65) Prior Publication Data
US 2018/0074696 A1    Mar. 15, 2018

(30) Foreign Application Priority Data
Sep. 13, 2016    (KR) .................. 10-2016-0118235

(51) Int. Cl.
*G06F 3/048*    (2013.01)
*G06F 3/0488*    (2013.01)
(Continued)

(52) U.S. Cl.
CPC ........ *G06F 3/04886* (2013.01); *G06F 3/0485* (2013.01); *G06F 3/04845* (2013.01);
(Continued)

(58) Field of Classification Search
CPC ..... G06F 3/0481–0489; G06F 3/04886; G06F 3/04883; G06F 3/04845; G06F 3/0485;
(Continued)

(56) References Cited

U.S. PATENT DOCUMENTS 5,987,336 A * 11/1999 Sudo .................... H04M 1/233
                                                           455/566
6,215,474 B1 * 4/2001 Shah .................. H04M 1/0214
                                                           345/156
(Continued)

FOREIGN PATENT DOCUMENTS

CN    101060676 A    10/2007
CN    101876879 A    11/2010
(Continued)

OTHER PUBLICATIONS

Huawei, Huawei x3 Softkey Hiding, Naroo Princess, Naver Blog, Jan. 11, 2015.
(Continued)

*Primary Examiner* — Steven B Theriault
(74) *Attorney, Agent, or Firm* — Jefferson IP Law, LLP

(57) ABSTRACT

A method and an apparatus for displaying a soft key in an electronic device are provided. The electronic device includes a display, and a processor. The processor may control the display to display an execution screen of an application and a soft key, determine whether the execution screen of the application is changed, and control the display to change a graphic attribute of a soft key display region in response to changing the execution screen of the application.

12 Claims, 32 Drawing Sheets

(51) Int. Cl.
*G06F 3/0484* (2013.01)
*G06F 3/0485* (2013.01)
*G06F 3/0481* (2013.01)

(52) U.S. Cl.
CPC ...... *G06F 3/04883* (2013.01); *G06F 3/04817* (2013.01); *G06F 2203/04803* (2013.01); *G06F 2203/04804* (2013.01)

(58) Field of Classification Search
CPC ....... G06F 2203/04803; G06F 3/04817; G06F 2203/04804; G06F 3/0233
See application file for complete search history.

(56) References Cited

U.S. PATENT DOCUMENTS

| | | | | |
|---|---|---|---|---|
| 6,332,024 | B1* | 12/2001 | Inoue | G06F 3/0236 379/433.04 |
| 6,587,118 | B1* | 7/2003 | Yoneda | G06F 3/0481 345/629 |
| 6,892,081 | B1* | 5/2005 | Elomaa | H04M 1/72519 379/433.01 |
| 7,020,849 | B1* | 3/2006 | Chen | G09G 3/20 345/1.1 |
| RE39,959 | E* | 12/2007 | Sudo | H04M 1/2745 345/169 |
| 7,312,798 | B2* | 12/2007 | Yach | G09G 5/14 345/589 |
| 7,619,615 | B1* | 11/2009 | Donoghue | G06F 3/04895 345/169 |
| 8,185,164 | B2* | 5/2012 | Kim | H04M 1/2747 455/566 |
| 8,566,044 | B2* | 10/2013 | Shaffer | G06F 3/04883 702/57 |
| 8,572,515 | B2* | 10/2013 | Ainslie | G06F 3/038 345/173 |
| 8,863,189 | B2* | 10/2014 | White | H04N 7/17318 725/46 |
| 8,984,443 | B2* | 3/2015 | Kano | G06F 3/0489 715/835 |
| 9,513,783 | B1* | 12/2016 | Vaidya | G06F 9/451 |
| 9,928,028 | B2* | 3/2018 | Jung | G06F 3/167 |
| 10,152,197 | B1* | 12/2018 | Xue | G06F 9/453 |
| 2002/0065110 | A1* | 5/2002 | Enns | H04M 1/72525 455/566 |
| 2002/0072394 | A1* | 6/2002 | Muramatsu | G06F 3/0236 455/566 |
| 2002/0158915 | A1* | 10/2002 | Rowell, Jr. | G06F 3/0489 715/835 |
| 2003/0007012 | A1* | 1/2003 | Bate | G06F 3/0482 715/825 |
| 2003/0103088 | A1* | 6/2003 | Dresti | G06F 3/0481 715/835 |
| 2003/0157970 | A1* | 8/2003 | Kraft | H04M 1/7258 455/566 |
| 2004/0203651 | A1* | 10/2004 | Qu | H04M 1/575 455/414.1 |
| 2004/0259587 | A1* | 12/2004 | Chadha | H04M 1/0254 455/550.1 |
| 2005/0190196 | A1* | 9/2005 | O'Neil | G06F 3/0482 345/589 |
| 2005/0266866 | A1* | 12/2005 | Ahya | G06F 9/453 455/502 |
| 2006/0031465 | A1* | 2/2006 | Ahya | H04M 1/7258 709/224 |
| 2006/0107219 | A1* | 5/2006 | Ahya | G06F 9/465 715/745 |
| 2006/0174215 | A1* | 8/2006 | Yan | G06F 8/38 715/825 |
| 2006/0193450 | A1* | 8/2006 | Flynt | H04M 3/5307 379/88.13 |
| 2006/0195528 | A1* | 8/2006 | Stroupe | H04M 1/663 709/206 |
| 2007/0035524 | A1* | 2/2007 | Hyatt | G06F 1/1626 345/173 |
| 2007/0050136 | A1* | 3/2007 | Lee | G01C 21/3664 701/486 |
| 2007/0094280 | A1* | 4/2007 | Vartiainen | H04M 1/72522 |
| 2007/0103454 | A1* | 5/2007 | Elias | G06F 1/1626 345/173 |
| 2007/0157271 | A1* | 7/2007 | Hiraoka | H04N 7/17309 725/100 |
| 2007/0204237 | A1* | 8/2007 | Guo | G06F 3/0202 715/822 |
| 2007/0245269 | A1 | 10/2007 | Kim et al. | |
| 2007/0287540 | A1* | 12/2007 | Kiran | G07F 17/32 463/37 |
| 2008/0030474 | A1* | 2/2008 | Toyokura | G06F 1/1624 345/169 |
| 2008/0079689 | A1* | 4/2008 | Koskinen | G09G 5/00 345/156 |
| 2008/0119133 | A1* | 5/2008 | Rao | G06Q 10/1095 455/3.05 |
| 2008/0161059 | A1* | 7/2008 | Kraft | H04M 1/274508 455/566 |
| 2008/0163082 | A1* | 7/2008 | Rytivaara | G06F 1/1626 715/762 |
| 2008/0174564 | A1* | 7/2008 | Kim | G06F 3/0488 345/173 |
| 2008/0182599 | A1* | 7/2008 | Rainisto | H04M 1/72552 455/466 |
| 2009/0165145 | A1* | 6/2009 | Haapsaari | H04M 1/72563 726/28 |
| 2009/0178007 | A1* | 7/2009 | Matas | G06F 3/0482 715/835 |
| 2009/0178010 | A1 | 7/2009 | Chaudhri | |
| 2009/0258638 | A1* | 10/2009 | Lee | H04M 1/72583 455/418 |
| 2009/0312062 | A1* | 12/2009 | Horodezky | G06F 3/0238 455/566 |
| 2010/0016003 | A1* | 1/2010 | Shapiro | H04L 43/0811 455/466 |
| 2010/0105442 | A1* | 4/2010 | Yoo | H04M 1/22 455/566 |
| 2010/0115452 | A1* | 5/2010 | Chabot | G06F 16/957 715/779 |
| 2010/0173705 | A1* | 7/2010 | Manning | G07F 17/3211 463/30 |
| 2010/0192105 | A1* | 7/2010 | Kim | G06F 3/0488 715/834 |
| 2010/0262493 | A1* | 10/2010 | Tahkokallio | G06Q 30/0255 705/14.53 |
| 2010/0281431 | A1* | 11/2010 | Kano | G06F 3/0489 715/835 |
| 2010/0321324 | A1* | 12/2010 | Fukai | A61B 8/00 345/173 |
| 2011/0131521 | A1* | 6/2011 | Cho | G06F 3/016 715/772 |
| 2011/0157001 | A1* | 6/2011 | Bose | G06F 3/1462 345/156 |
| 2011/0225219 | A1* | 9/2011 | Midorogi | G06F 15/0225 708/168 |
| 2011/0249025 | A1* | 10/2011 | Mitani | G06T 7/0004 345/629 |
| 2011/0265002 | A1* | 10/2011 | Hong | G06F 3/04855 715/702 |
| 2012/0109516 | A1* | 5/2012 | Miyazaki | G01C 21/367 701/428 |
| 2012/0242706 | A1* | 9/2012 | Zhang | H04M 1/7258 345/666 |
| 2013/0174082 | A1 | 7/2013 | Khandker et al. | |
| 2014/0123052 | A1 | 5/2014 | Chaudhri et al. | |
| 2014/0223381 | A1* | 8/2014 | Huang | G06F 3/04883 715/863 |
| 2014/0237367 | A1* | 8/2014 | Jung | G06F 3/04845 715/728 |
| 2014/0248852 | A1* | 9/2014 | Raleigh | H04M 15/723 455/407 |
| 2015/0007102 | A1 | 1/2015 | Choi et al. | |

(56) References Cited

U.S. PATENT DOCUMENTS

| | | | |
|---|---|---|---|
| 2015/0074525 A1 | 3/2015 | Costenaro et al. | |
| 2015/0082225 A1* | 3/2015 | Shearer | G06F 3/0482 715/771 |
| 2015/0277673 A1* | 10/2015 | Ye | G06F 3/04842 715/800 |
| 2015/0324080 A1 | 11/2015 | Jin et al. | |
| 2015/0378592 A1* | 12/2015 | Kim | G06F 1/1626 715/765 |
| 2016/0041702 A1* | 2/2016 | Wang | G06F 3/0482 715/830 |
| 2016/0124637 A1 | 5/2016 | Yoon et al. | |
| 2017/0310926 A1* | 10/2017 | Patel | H04N 7/141 |

FOREIGN PATENT DOCUMENTS

| | | |
|---|---|---|
| CN | 103995657 A | 8/2014 |
| EP | 2 854 013 A1 | 1/2015 |
| EP | 2854013 A1 | 4/2015 |
| KR | 10-2010-0090879 A | 8/2010 |
| KR | 10-2015-0002312 A | 1/2015 |
| KR | 10-2016-0051373 A | 5/2016 |

OTHER PUBLICATIONS

International Search Report dated Dec. 15, 2017, issued in the International Patent Application No. PCT/KR2017/010033.
Extended European Search Report dated Aug. 20, 2019, issued in a counterpart European application No. 17851116.8-1221/3488333.
Chinese Office Action dated Jul. 28, 2020, issued in Chinese application No. 201710822482.2.

* cited by examiner

METHOD FOR DISPLAYING SOFT KEY AND ELECTRONIC DEVICE THEREOF

CROSS-REFERENCE TO RELATED APPLICATION(S)

This application claims the benefit under 35 U.S.C. § 119(a) of a Korean patent application filed on Sep. 13, 2016 in the Korean Intellectual Property Office and assigned Serial number 10-2016-0118235, the entire disclosure of which is hereby incorporated by reference.

TECHNICAL FIELD

The present disclosure relate to an electronic device. More particularly, the present disclosure relates to a method of displaying a soft key in the electronic device, and the electronic device for processing the method.

BACKGROUND

With the development of a semiconductor technology, an electronic device may provide a multimedia function. For example, the electronic device may provide a user with a variety of multimedia content by using an application.

An amount of information required by the user is increased since the multimedia function is provided through the electronic device, and thus an electronic device including a touch screen suitable for providing a greater amount of information is widely used.

The electronic device provides a function of displaying a soft key on the touch screen which performs a function of a physical button instead of a physical hard key in order to sufficiently ensure an area of a touch screen within a limited size.

The above information is presented as background information only to assist with an understanding of the present disclosure. No determination has been made, and no assertion is made, as to whether any of the above might be applicable as prior art with regard to the present disclosure.

SUMMARY

An electronic device may display a soft key display region on at least one region of a display by using a fixed display variable (e.g., a graphic attribute variable, size, position, etc.). For example, the electronic device may display the soft key display region always in black. For another example, the electronic device may display the soft key display region always in blue with a transparency of 30%. That is, the electronic device persistently maintains displaying of a soft key in at least one region of the display and thus provides a physical button by converting it into the soft key, but cannot effectively utilize an area of a touch screen which becomes wide.

Aspects of the present disclosure are to address at least the above-mentioned problems and/or disadvantages and to provide at least the advantages described below. Accordingly, an aspect of the present disclosure is to provide a method and apparatus for displaying a soft key in an electronic device.

In accordance with an aspect of the present disclosure, an electronic device is provided. The electronic device includes a display, and a processor. The processor may be configured to control the display to display an execution screen of an application and a soft key, determine whether the execution screen of the application is changed, and control the display to change a graphic attribute for a soft key display region in response to changing the execution screen of the application.

In accordance with another aspect of the present disclosure, a method of operating an electronic device is provided. The method includes displaying an execution screen of an application and a soft key, determining whether the execution screen of the application is changed, and changing a graphic attribute for a soft key display region in response to changing the execution screen of the application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
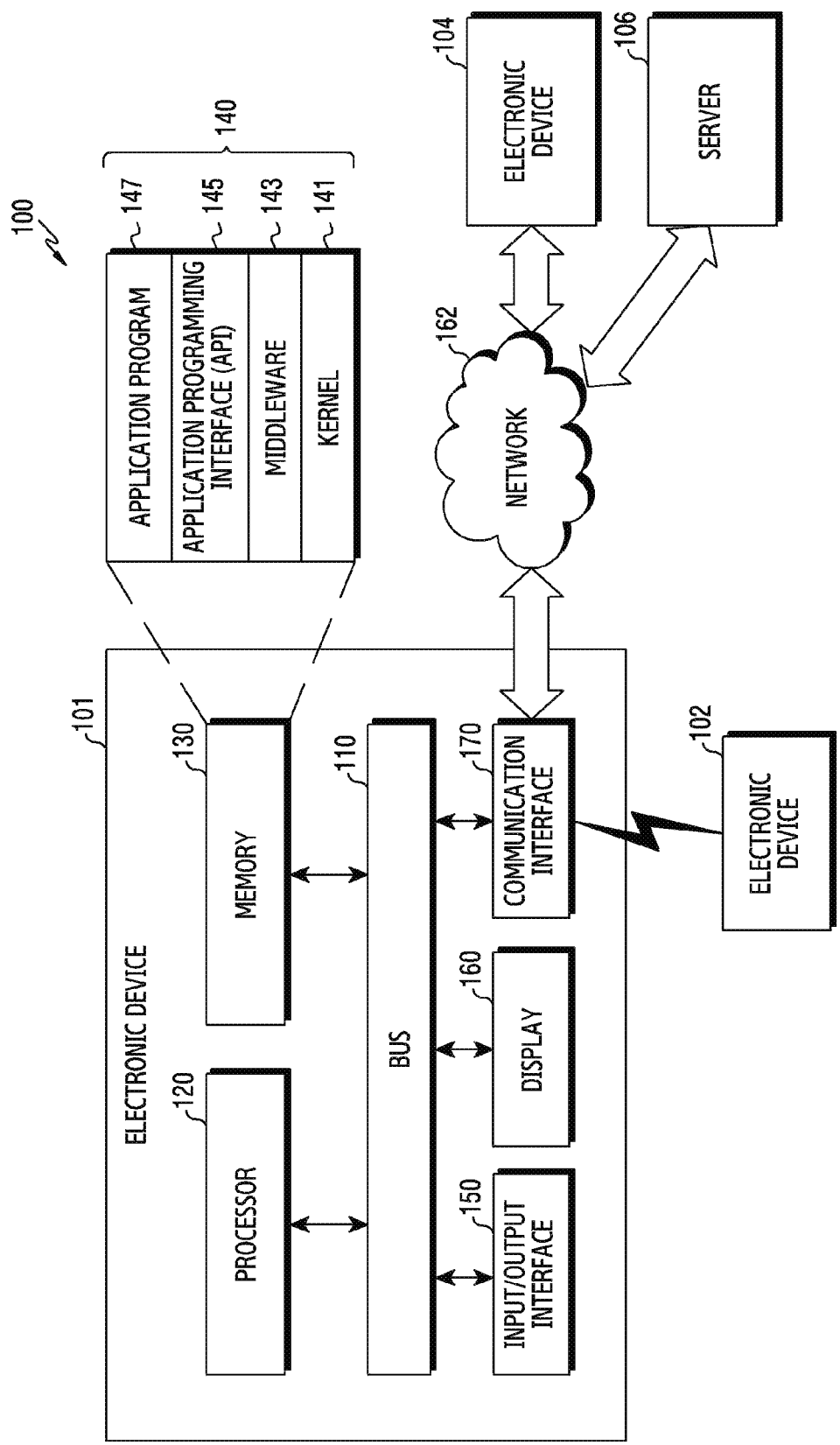
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, or a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), or a bio-implantable type (e.g., an implantable circuit).

According to some embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, or an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, or various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a diagram illustrating a network environment including an electronic device according to various embodiments of the present disclosure.

Referring to FIG. 1, an electronic device 101 within a network environment 100, according to various embodiments. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 120 to 170 and delivers a communication (e.g., a control message or data) between the components 120 to 170.

The processor 120 may include one or more of a CPU, an AP, or a communication processor (CP). The processor 120 may perform operations or data processing with respect to control or communication of at least one other element of the electronic device 101. According to an embodiment of the present disclosure, the processor 120 may perform an operation to receive first proximity service data and receive second proximity service data included in the first proximity service data using guide information which is used for receiving the second proximity service data. In addition, the processor 120 may control transmission of the first proximity service data including guide information which is used for receiving the second proximity service data.

According to an embodiment, the processor 120 may control the display 160 to display a soft key and an execution screen of an application. For example, the processor 120 may determine whether to execute the application based on a user input detected via the input/output interface 150 or the display 160 (e.g., the touch screen). For another example, the processor 120 may determine whether to execute the application based on a user input received via the communication interface 170. If the application is executed, the processor 120 may confirm a graphic attribute (e.g., color, transparency, brightness) of the execution screen of the application. The processor 120 may determine the graphic attribute of a soft key display region based on the graphic attribute of the execution screen of the application. For example, the processor 120 may control the display 160 such that color of the soft key display region overlaps with the soft key display region in the execution screen of the application or is displayed equally or similarly to color of an adjacent region.

According to an embodiment, the processor 120 may selectively change the graphic attribute of the soft key display region based on whether the execution screen of the application is switched. For example, the processor 120 may determine whether the execution screen of the application is switched according to a scroll operation. If the execution screen of the application is not switched, the processor 120 may control the display 160 to change the graphic attribute of the soft key display region based on the graphic attribute of the execution screen of the application. If the execution screen of the application is switched, the processor 120 may control the display 160 to maintain the graphic attribute of the soft key display region.

According to an embodiment, the processor 120 may change the execution screen of the application. For example, the processor 120 may determine whether a scroll event occurs based on a signal corresponding to a user input provided via the input/output interface 150 or the display 160. If the screen event occurs, the processor 120 may control the display 160 to display the execution screen of the application by switching it according to a scroll function. For another example, the processor 120 may determine whether the scroll event occurs based on a signal corresponding to a user input received via the communication interface 170. If the screen event occurs, the processor 120 may control the display 160 to display the execution screen of the application by switching it according to the scroll function.

According to an embodiment, the processor 120 may change the graphic attribute of the soft key display region based on a change in the execution screen of the application. For example, if the execution screen of the application is scrolled, the processor 120 may control the display 160 to display the soft key display region with a predefined transparency (e.g., 70%). For another example, if the execution screen of the application is scrolled, the processor 120 may confirm a change variable (e.g., a movement direction, a movement speed, a movement time, a movement distance, etc.) for the execution screen of the application according to the scroll operation. The processor 120 may determine the transparency based on the change variable. The processor 120 may control the display 160 to display the soft key display region with a transparency corresponding to the change variable.

According to an embodiment, the processor 120 may selectively change the graphic attribute of the soft key display region based on whether the execution screen of the application overlaps with the soft key display region. For example, if the execution screen of the application is scrolled, the processor 120 may determine whether the execution screen of the application overlaps with the soft key display region. If at least one portion of the application execution screen overlaps with the soft key display region, the processor 120 may control the transparency of the soft key display region so that the soft key display region becomes relatively transparent. For example, the processor 120 may determine the transparency of the soft key display region based on the change variables of the execution screen of the application. If the execution screen of the application is separated from the soft key display region, the processor 120 may control the display 160 to maintain the transparency of the soft key display region. Additionally or alternatively, if the execution screen of the application is separated from the soft key display region, the processor 120 may control the display 160 such that the transparency of the soft key display region becomes relatively high. In this case, the processor 120 may control the display 160 such that the execution screen of the application is displayed by being extended to up to the soft key display region.

According to an embodiment, if the scrolling operation is terminated, the processor 120 may restore the transparency of the soft key display region. For example, if the scroll operation is terminated, the processor 120 may restore the transparency of the soft key display region changed according to the occurrence of the scroll event to a previous transparency used before the scroll event occurs. The processor 120 may determine whether the graphic attribute of the execution screen of the application is changed according to the scroll operation in response to the restoration of the transparency of the soft key display region. If the graphic attribute of the execution screen of the application is changed, the processor 120 may control the display 160 to change the graphic attribute of the soft key display region based on the graphic attribute of the execution screen of the application. If the graphic attribute of the execution screen of the application is not changed, the processor 120 may control the display 160 to maintain the graphic attribute of the soft key display region. Herein, the graphic attribute of the execution screen of the application may include color extracted from at least one pixel among a plurality of pixels included in a region overlapping with the soft key display region in the execution screen of the application or a region adjacent to the soft key display region in the execution screen of the application.

According to an embodiment, the processor 120 may hide a soft key. For example, if an input for hiding the soft key is detected in a state where the execution screen of the application is displayed together with the soft key, the processor 120 may control the display 160 to hide the soft key display region. In this case, the processor 120 may generate a menu bar including a function key corresponding to an attribute of the application, and thereafter may control the display 160 such that the generated menu bar is displayed at a position where the soft key display region is displayed.

According to an embodiment, the processor 120 may display the soft key based on whether an event for displaying the soft key occurs. For example, if an input for displaying the soft key is detected in a state where the execution screen of the application is displayed, the processor 120 may control the display 160 to display the soft key display region.

For example, if the menu bar is displayed in the soft key display region, the processor 120 may control the display 160 to display the soft key display region at a position where the menu bar is displayed.

The memory 130 may include at least one of a volatile memory or a non-volatile memory. For example, the memory 130 may store commands or data related to at least one other element of the electronic device 101. According to an embodiment, the memory 130 may store at least one of software or programs 140. As illustrated in FIG. 1, the at least one of software or programs 140 may include at least one or more of a kernel 141, middleware 143, an application programming interface (API) 145, or an application program (or an application) 147, etc. At least part of the kernel 141, the middleware 143, or the API 145 may be referred to as an operating system (OS).

According to an embodiment, the memory 130 may store information for determining the transparency of the soft key display region. For example, the memory 130 may store a transparency value corresponding to at least one of a movement direction, movement speed, movement time, or movement distance of the execution screen of the application to be scrolled. For example, the memory 130 may store a transparency value which indicates that the faster the movement speed of the execution screen of the application, the more transparent the soft key display region. For example, the memory 130 may store a transparency value which indicates that the longer the movement time of the execution screen of the application, the more transparent the soft key display region. For example, the memory 130 may store a transparency value which indicates that the farther the movement distance of the execution screen of the application, the more transparent the soft key display region.

The kernel 141 may control or manage system resources (e.g., the bus 110, the processor 120, the memory 130, or the like) used for performing operations or functions implemented by the other programs (e.g., the middleware 143, the API 145, or the application program 147). Additionally, the kernel 141 may provide an interface for allowing the middleware 143, the API 145, or the application program 147 to access an individual element of the electronic device 101 and to control or manage the system resources.

The middleware 143 may serve as an intermediary for allowing the API 145 or the application program 147 to communicate with the kernel 141 and exchange data with the kernel 141. In addition, the middleware 143 may perform operations (e.g., scheduling or load balancing) for controlling work requests received from the application program 147, for example, by assigning a priority to each work request for using the system resources (e.g., the bus 110, the processor 120, the memory 130, or the like) of the electronic device 101 to at least one application of the application program 147.

The API 145 may be an interface for allowing the application program 147 to control a function provided by the kernel 141 or the middleware 143, and may include, for example, at least one interface or function (e.g., instructions) for controlling a file, controlling a window, processing an image, or controlling a text.

The input/output interface 150 may serve as an interface for transmitting instructions or data input from a user or another external device to the other element(s) of the electronic device 101. Furthermore, the input/output interface 150 may output the instructions or data received from another element(s) of the electronic device 101 to the user or another external device.

Examples of the display 160 may include a liquid crystal display (LCD), a light-emitting diode (LED) display, an organic LED (OLED) display, a microelectromechanical systems (MEMS) display, and an electronic paper display. The display 160 may display, for example, various types of contents (e.g., text, images, videos, icons, or symbols) to a user. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), as a cellular communication protocol. In addition, the wireless communication may include, for example, short range communication 164. The short-range communication 164 may include at least one of Wi-Fi, Bluetooth® (BT), near field connection (NFC), and global navigation satellite system (GNSS). GNSS may include, for example, at least one of GPS, global navigation satellite system (GLONASS), a BeiDou Navigation satellite system (hereinafter referred to as "BeiDou"), or European global satellite-based navigation system (GALILEO), based on a location, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard-232 (RS-232), or a plain old telephone service (POTS). The network 162 may include at least one of a communication network such as a computer network (e.g., a local area network (LAN) or a wide area network (WAN)), the internet, or a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 performs functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or further process the received result to provide the requested functions or services. To this end, for example, cloud computing, distributed computing, or client-server computing technologies may be used.

Figure 2:
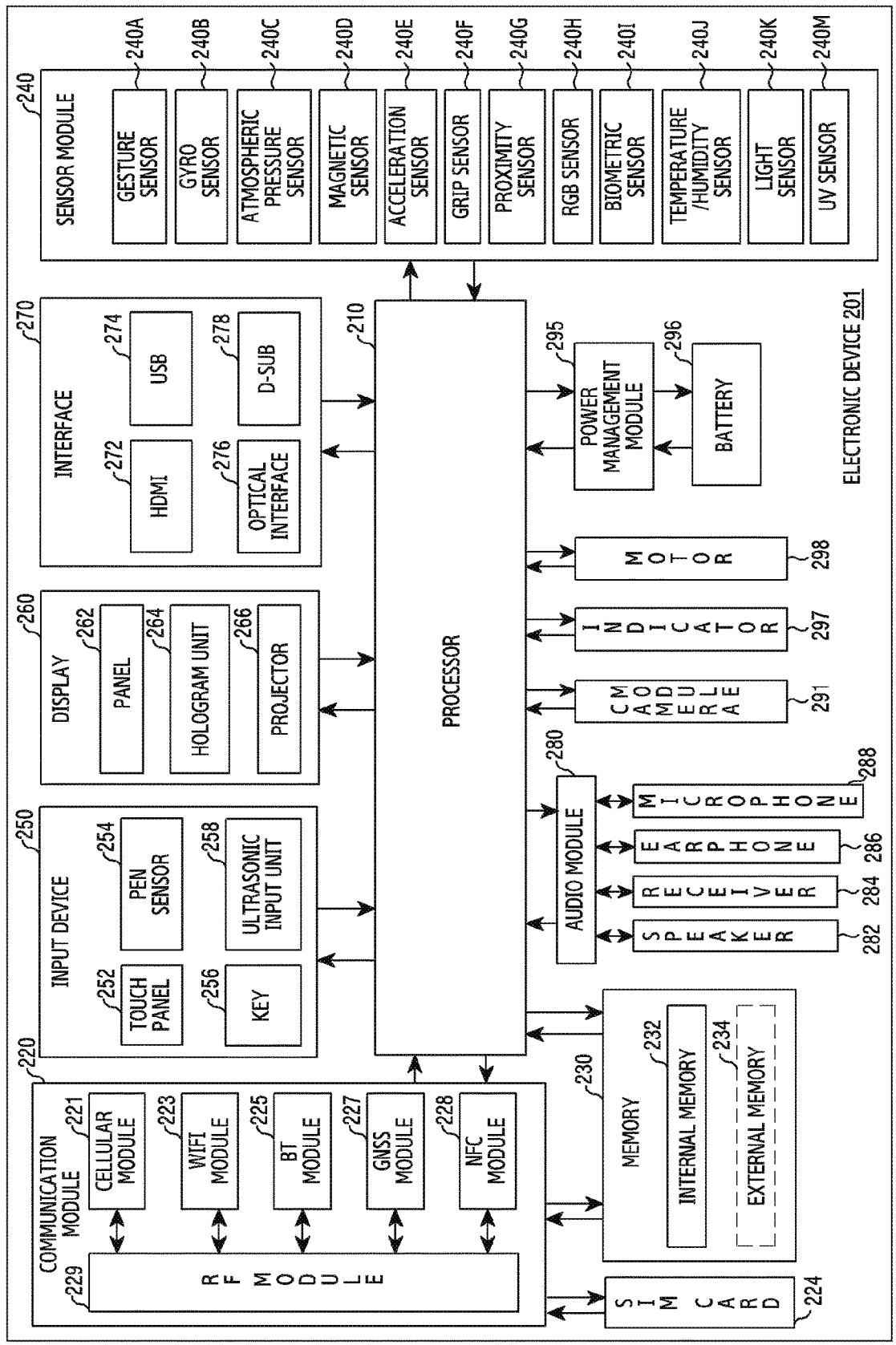
FIG. 2 illustrates a block diagram of an electronic device according to various embodiments of the present disclosure.

FIG. 2 is a block diagram illustrating an electronic device according to various embodiments of the present disclosure.

Referring to FIG. 2, the electronic device 201 may include, for example, all or a part of the electronic device 101 shown in FIG. 1. The electronic device 201 may include one or more processors 210 (e.g., APs), a communication module (or communication circuit) 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software constitutional elements connected to the processor 210 by driving, for example, an OS or an application program, and may process a variety of data including multimedia data and may perform an arithmetic operation. The processor 210 may be implemented, for example, with a system on chip (SoC). According to an embodiment, the processor 210 may further include a graphic processing unit (GPU) and/or an image signal processor. The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory. According to an embodiment, the processor 210 may control the display 260 to change the graphic attribute (e.g., transparency) of the soft key display region based on the change in the execution screen of the application. According to an embodiment, the processor 120 may control the display 260 to change the graphic attribute (e.g., color) of the soft key display region based on the graphic attribute (e.g., color) of the application in response to the switching of the execution screen of the application. According to an embodiment, the processor 210 may control the display 260 to display or hide the soft key in response to the input detection for displaying of hiding the soft key.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a GLONASS module, a BeiDou module, or a GALILEO module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a SIM 224 (e.g., the SIM card). According to an embodiment of the present disclosure, the cellular module 221 may perform at least some of the functions that the processor 210 may provide. According to an embodiment of the present disclosure, the cellular module 221 may include a CP.

Each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in a single integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to an embodiment of the present disclosure, at least one of the cellular module 221, the Wi-Fi module 223, the BT module 225, the GNSS module 227, or the NFC module 228 may transmit/receive an RF signal through a separate RF module.

The SIM (SIM 224) may include, for example, a card including a subscriber identity module or an embedded SIM, and may further include unique identification information (e.g., an integrated circuit card identifier (ICCID)) or subscriber information (e.g., an international mobile subscriber identity (IMSI)).

The memory 230 (e.g., the memory 130) may include, for example, an embedded (or internal) memory 232 or an external memory 234. The embedded memory 232 may include at least one of a volatile memory (e.g., a dynamic random access memory (DRAM), a static RAM (SRAM), a synchronous DRAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro-SD, a mini-SD, an extreme digital (xD), a multimedia card (MMC), a memory stick, or the like. The external memory 234 may be functionally and/or physically connected to the electronic device 201 through various interfaces.

The sensor module 240 may be configured to measure a physical quantity or detect an operation state of the electronic device 201, and convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, a light sensor 240K, or an ultraviolet light (UV) sensor 240M. Additionally or alternatively, the sensor module 240 may further include one or more sensors (not shown), including an electronic nose (E-nose) sensor, an electromyography (EMG) sensor, an electroencephalogram (EEG) sensor, an electrocardiogram (ECG) sensor, an infrared (IR) sensor, an iris scan sensor, and a finger scan sensor. The sensor module 240 may further include a control circuit for controlling one or more sensors included therein. According to an embodiment of the present disclosure, the electronic device 201 may further include another processor configured to control the sensor module 240, as a part of the processor 210 or a separate component from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an IR type, or an ultrasonic type. The touch panel 252 may further include a control circuit. The touch panel 252 may further include a tactile layer, and provide a tactile reaction to the user.

The (digital) pen sensor (digital pen or stylus) 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three-dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a d-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/MMC interface, or an IR data association (IrDA) standard interface.

As illustrated in FIG. 2, the audio module 280, for example, may be configured to bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image, a moving image, or a video. According to an embodiment of the present disclosure, the camera module 291 may include one or more image sensors (e.g., a front sensor or a rear sensor), a lens, an internet service provider (ISP) or a flash (e.g., LED or xenon lamp).

The power management module 295 may manage, for example, power of the electronic device 201. According to an embodiment of the present disclosure, the power management module 295 may include a power management IC (PMIC), a charger IC, or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, at least one of a rechargeable battery or a solar battery.

The indicator 297 may indicate a state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to certain standards such as digital multimedia broadcasting (DMB), digital video broadcasting (DVB), or media flow.

According to various embodiments of the present disclosure, an electronic device may include a display, and a processor. The processor may be configured to control the display to display an execution screen of an application and a soft key, determine whether the execution screen of the application is changed, and control the display to change a graphic attribute of a soft key display region in response to changing the execution screen of the application.

According to various embodiments, the processor may be configured to identify the graphic attribute of the execution screen of the application, determine a graphic attribute of the soft key display region based on the graphic attribute of the execution screen of the application, and control the display to display the execution screen of the application and the soft key based on the graphic attribute of the soft key.

According to various embodiments, the processor may be configured to determine whether the execution screen of the application overlaps with the soft key display region, determine a region for detecting the graphic attribute of the execution screen of the application based on whether the execution screen of the application overlaps with the soft key display region, and detect the graphic attribute of the execution screen of the application from the determined region.

According to various embodiments, the processor may be configured to determine that the execution screen of the application is changed if a scroll event occurs.

According to various embodiments, the processor may be configured to determine whether a scroll operation for the execution screen of the application is terminated, and control the display to restore the graphic attribute of the soft key display region if the scroll operation is terminated.

According to various embodiments, the processor may be configured to determine whether the graphic attribute of the execution screen of the application is changed when the graphic attribute of the soft key display region is restored, control the display to change the graphic attribute of the soft key display region based on the graphic attribute of the execution screen of the application if the graphic attribute of the execution screen of the application is changed, and control the display to maintain the graphic attribute of the soft key display region if the graphic attribute of the execution screen of the application is not changed.

According to various embodiments, the graphic attribute may include at least one of color, transparency, or brightness.

According to various embodiments, the processor may be configured to determine the graphic attribute of the soft key display region based on a change variable for the execution screen of the application.

According to various embodiments, the change variable may include at least one of a movement direction, movement speed, movement time, or movement distance of the execution screen of the application based on the scroll operation.

According to various embodiments, the processor may be configured to identify brightness of the soft key display region, and control the display to change color of an icon corresponding to the soft key based on the brightness.

Figure 3:
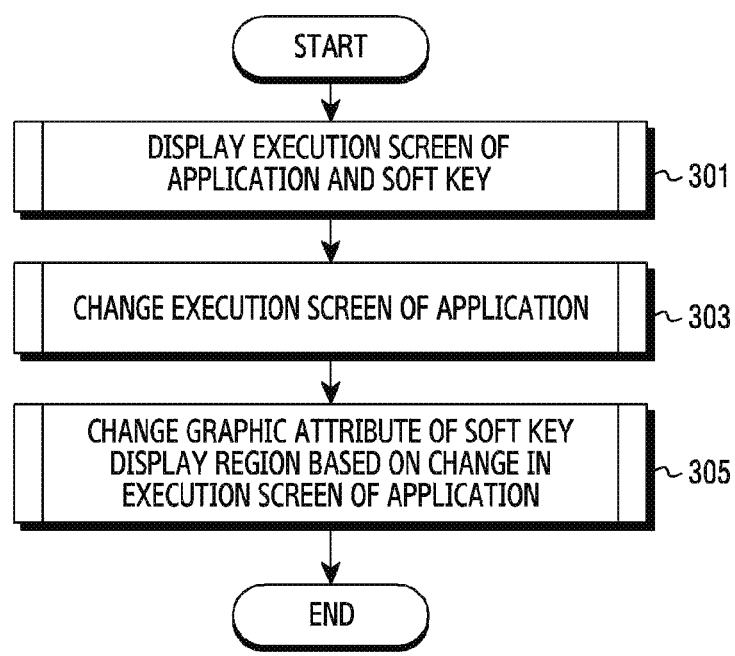
FIG. 3 is a flowchart for a display control of a soft key in an electronic device according to various embodiments of the present disclosure.

FIG. 3 is a flowchart for a display control of a soft key in an electronic device according to various embodiments of the present disclosure. In the following description, the electronic device may include all or some parts (e.g., the processor 120) of the electronic device 101 of FIG. 1.

Referring to FIG. 3, in operation 301, the electronic device may display a soft key and an execution screen of an application. For example, the processor 120 of the electronic device 101 may determine whether the application is executed. For example, the processor 120 may determine whether to execute the application based on a user input provided via the input/output interface 150 or the display 160 (e.g., a touch screen). If the application is executed, the processor 120 may confirm a graphic attribute (e.g., color, transparency, brightness) of the execution screen of the application. The processor 120 may determine a graphic attribute of a soft key display region based on the graphic attribute of the execution screen of the application.

In operation 303, the electronic device may change the execution screen of the application. For example, the processor 120 may determine whether a scroll event occurs to change the execution screen of the application. If the scroll event occurs, the processor 120 may control the display 160 to change the execution screen of the application according to a scroll operation.

In operation 305, the electronic device may change the graphic attribute of the soft key display region based on the change in the execution screen of the application. For example, if the execution screen of the application is scrolled, the processor 120 of the electronic device 101 may control a transparency of the soft key display region so that the soft key display region is relatively transparent. For example, the soft key display region may be pre-defined, or may be determined based on a change variable (e.g., a movement direction, a movement speed, a movement time, a movement distance, etc.) for the execution screen of the application. Additionally or alternatively, if the scroll operation of the execution screen of the application is terminated, the processor 120 may control the display 160 so that the transparency of the execution screen of the application is restored to a previous transparency used before the screen event occurs. In this case, the processor 120 may control the display 160 to match a graphic attribute of the execution screen of the application and the graphic attribute of the soft key display region.

Figure 4:
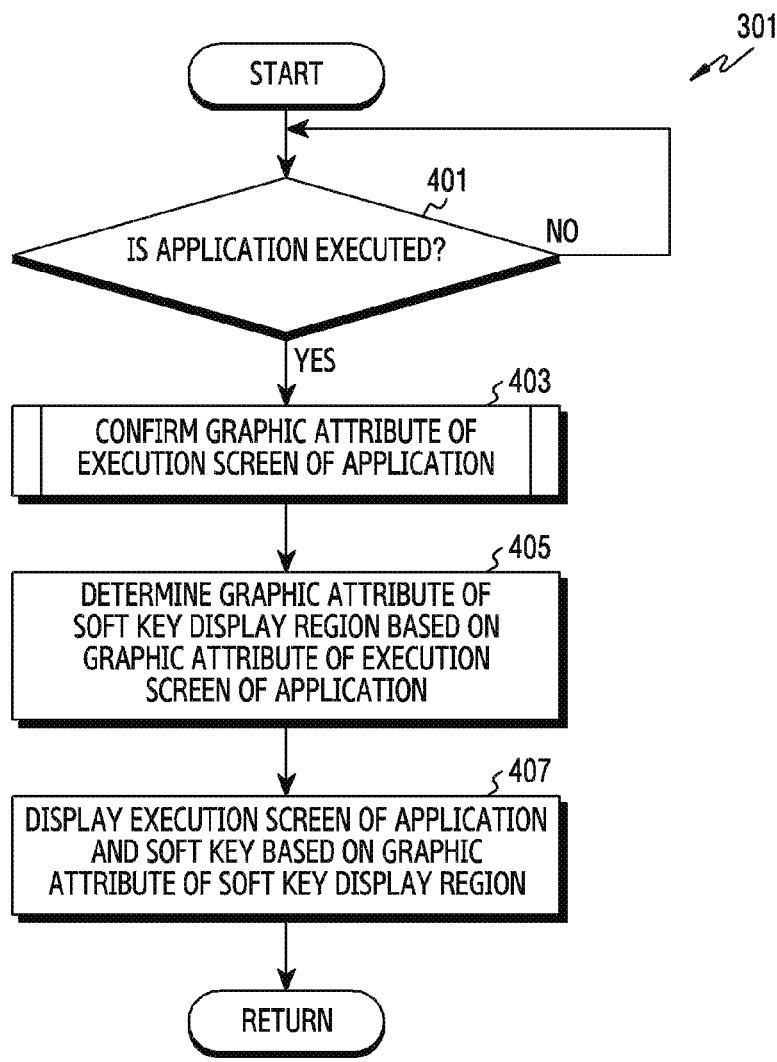
FIG. 4 is a flowchart illustrating an execution screen of an application and a soft key in an electronic device according to various embodiments of the present disclosure.
Figure 5A:
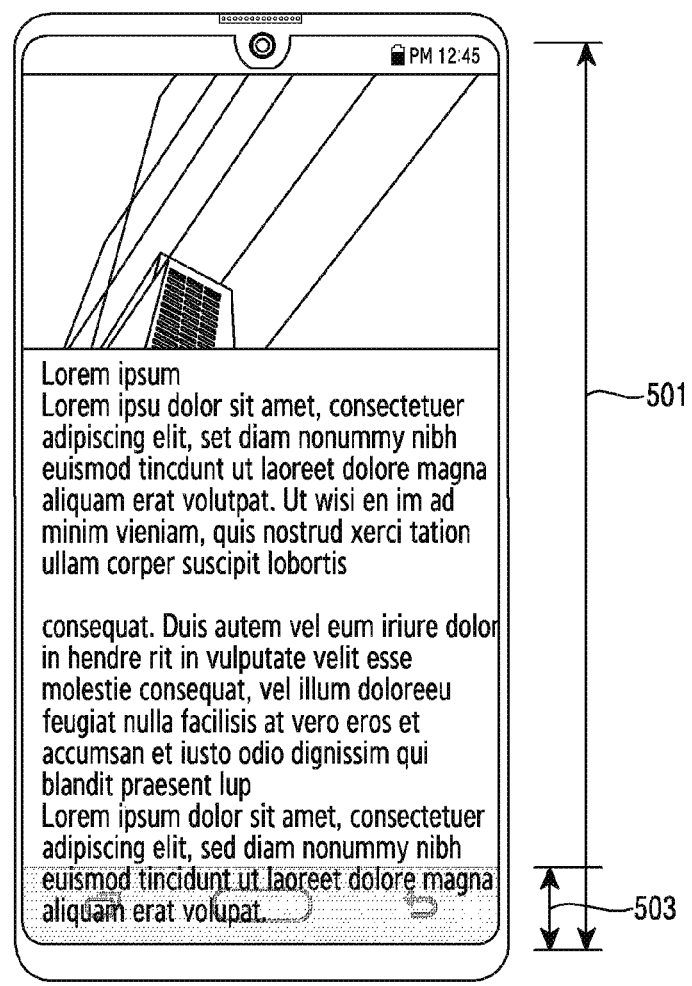
FIGS. 5A and 5B illustrate screen configurations for displaying an execution screen of an application and a soft key in an electronic device according to various embodiments of the present disclosure.
Figure 5B:
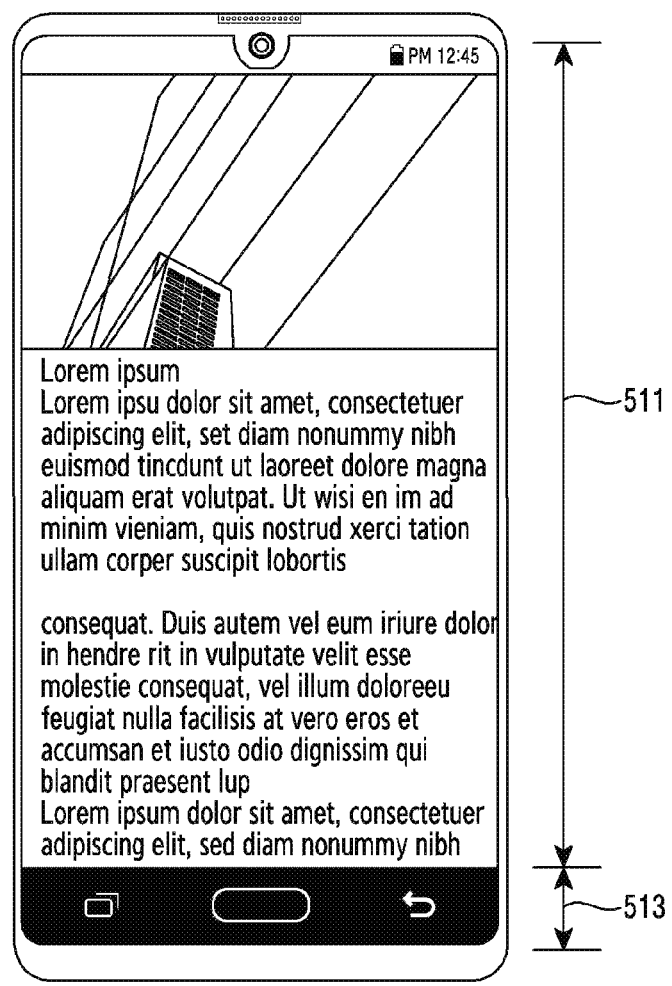

FIG. 4 is a flowchart illustrating an execution screen of an application and a soft key in an electronic device according to various embodiments of the present disclosure. FIGS. 5A and 5B illustrate screen configurations for displaying an execution screen of an application and a soft key in an electronic device according to various embodiments of the present disclosure. The following description is about an operation of displaying the execution screen of the application and the soft key in operation 301 of FIG. 3. In the following description, the electronic device may include all or some parts (e.g., the processor 120) of the electronic device 101 of FIG. 1.

Referring to FIG. 4, in operation 401, the electronic device may determine whether to execute the application. For example, the processor 120 of the electronic device 101 may determine whether to execute the application based on a signal corresponding to a user input provided via the input/output interface 150 or the display 160. For another example, the processor 120 may determine whether to execute the application based on a signal corresponding to a user input received via the communication interface 170. If the application is not executed, the processor 120 may persistently determine whether to execute the application.

In operation 403, if the application is executed, the electronic device may confirm a graphic attribute of the execution screen of the application. For example, the processor 120 may determine whether a size of the execution screen of the application is greater than or equal to a reference size. If the size of the execution screen of the application is greater than or equal to the reference size, the processor 120 may extract color of a region overlapping with a soft key display region in the execution screen of the application. If the size of the execution screen of the application is less than the reference size, the processor 120 may determine a detection region for extracting color from a region adjacent to the soft key display region in the execution screen of the application. The processor 120 may extract color of the detection region.

In operation 405, the electronic device may determine a graphic attribute of the soft key display region based on the graphic attribute of the execution screen of the application. For example, the processor 120 may convert color extracted from the detection region or the soft key display region in the execution screen of the application into a red-green-blue (RGB) value or a hue saturation value (HSV) value. The processor 120 may determine representative color based on the converted RGB value or HSV value. For example, the processor 120 may determine average color, of which a sum of color differences of the converted RGB values or the HSV values is minimum, as the representative color. For example, the processor 120 may determine most frequent color, which is the most frequently extracted from among the converted RGB values or the HSV values, as the representative color.

In operation 407, the electronic device may display the execution screen of the application and the soft key based on the graphic attribute of the soft key display region. For example, as shown in FIG. 5A, if a size of an execution screen 501 of an application is greater than or equal to a reference size, the processor 120 may change a transparency of representative color to a pre-defined value (e.g., 70%). The processor 120 may determine the representative color of which the transparency is changed as color of the soft key display region. The processor 120 may control the display 160 such that the execution screen 501 of the application and a soft key display region 503 are displayed in an overlapping manner. For another example, as shown in FIG. 5B, if a size of an execution screen 511 of an application is less than a reference size, the processor 120 may determine representative color as color of a soft key display region 513. The processor 120 may control the display 160 such that the execution screen 511 of the application and the soft key display region 513 are displayed in a separated manner.

According to an embodiment, the processor 120 may control the display 160 such that color of an icon corresponding to the soft key is changed based on brightness of the soft key display region. For example, the processor 120 may confirm the brightness of the soft key display region. If the brightness is included in a reference range (e.g., 0% to 50%/o), the processor 120 may control the display 160 such that a transparency of # ffffff (white) is changed to 500 among color codes of the icon corresponding to the soft key. If the confirmed brightness value is not included in the reference range (e.g., 51% to 100%), the processor 120 may control the display 160 such that a transparency of #000000 (black) is changed to 500 among color codes of the icon corresponding to the soft key.

Figure 6:
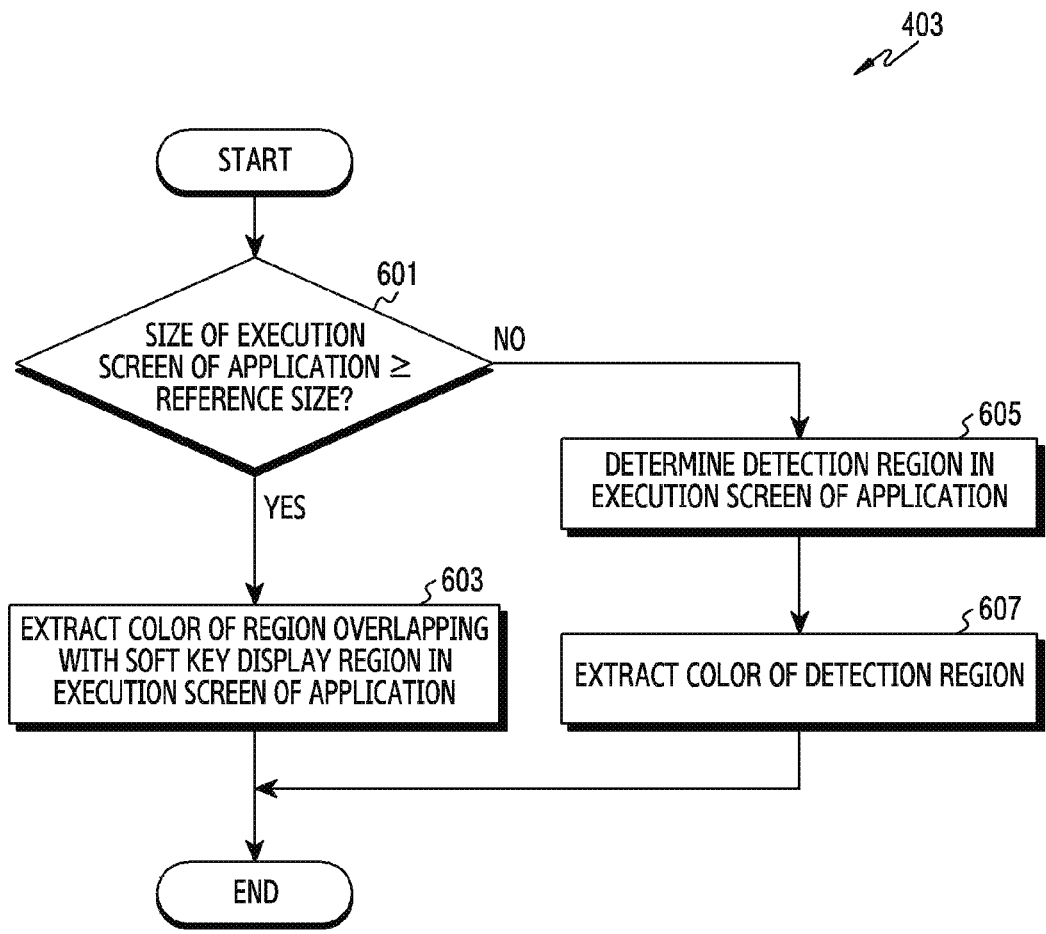
FIG. 6 illustrates a flowchart for extracting color from one region of an execution screen of an application in an electronic device according to various embodiments of the present disclosure.
Figure 7A:
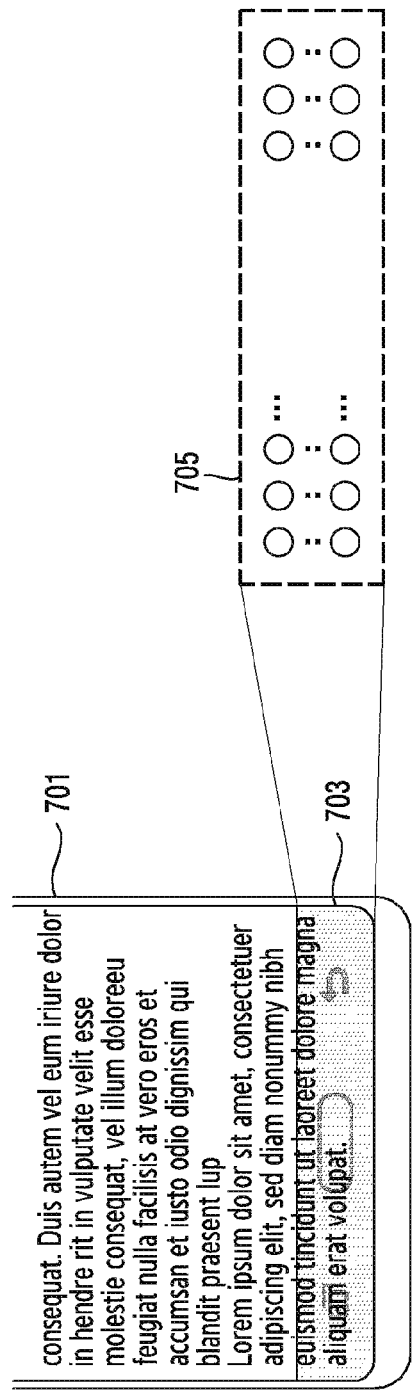
FIGS. 7A and 7B illustrate configurations for extracting color from one region of an execution screen of an application according to various embodiments of the present disclosure.
Figure 7B:
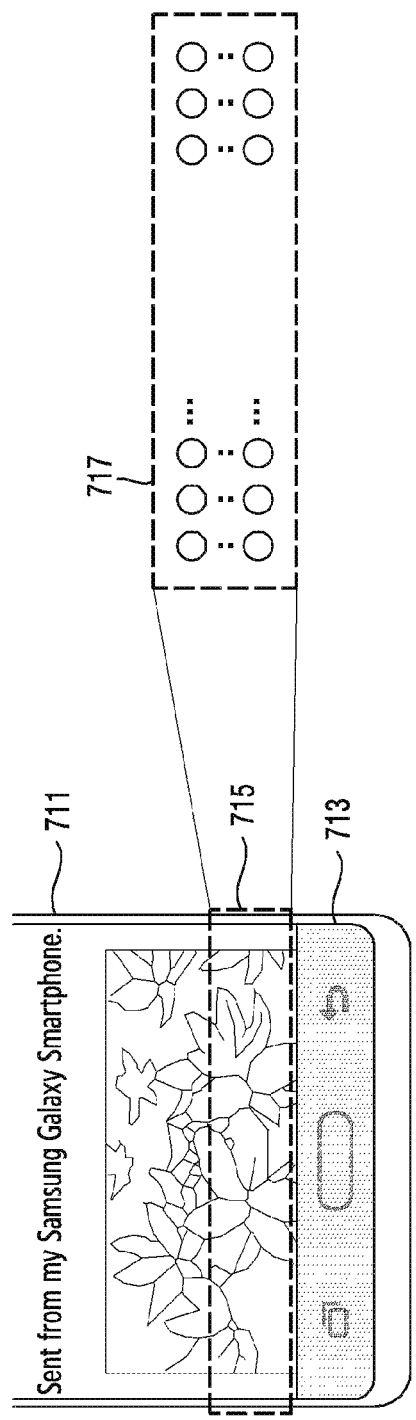

FIG. 6 illustrates a flowchart for extracting color from one region of an execution screen of an application in an electronic device according to various embodiments of the present disclosure. FIGS. 7A and 7B illustrate configurations for extracting color from one region of an execution screen of an application according to various embodiments of the present disclosure. The following description is about an operation of confirming a graphic attribute of the execution screen of the application in operation 403 of FIG. 4. In the following description, the electronic device may include all or some parts (e.g., the processor 120) of the electronic device 101 of FIG. 1.

Referring to FIG. 6, in operation 601, the electronic device may determine whether a size of an execution screen of an application is greater than or equal to a reference size. For example, the processor 120 of the electronic device 101 may determine whether the size of the execution screen of the application is greater than or equal to 16:9.

In operation 603, if the size of the execution screen of the application is greater than or equal to the reference size, the electronic device may extract color of a region overlapping with the soft key display region in the execution screen of the application. For example, as shown in FIG. 7A, the processor 120 may confirm the region overlapping with a soft key display region 703 of an execution screen 701 of the application. The processor 120 may extract color from at least one pixel among a plurality of pixels included in the region overlapping with the soft key display region 703 of the execution screen 701 of the application (see 705).

In operation 605, if the execution screen of the application is less than the reference size, the electronic device may determine a detection region in the execution screen of the application. For example, as shown in FIG. 7B, the processor 120 may determine a region having the same size as a soft key display region 713 as a detection region 715 in a region adjacent to the soft key display region 713 in the execution screen 711 of the application.

In operation 607, the electronic device may extract color of the detection region. For example, as shown in FIG. 7B, the processor 120 may extract color from at least one pixel among a plurality of pixels included in the detection region 715 (see 717).

Figure 8:
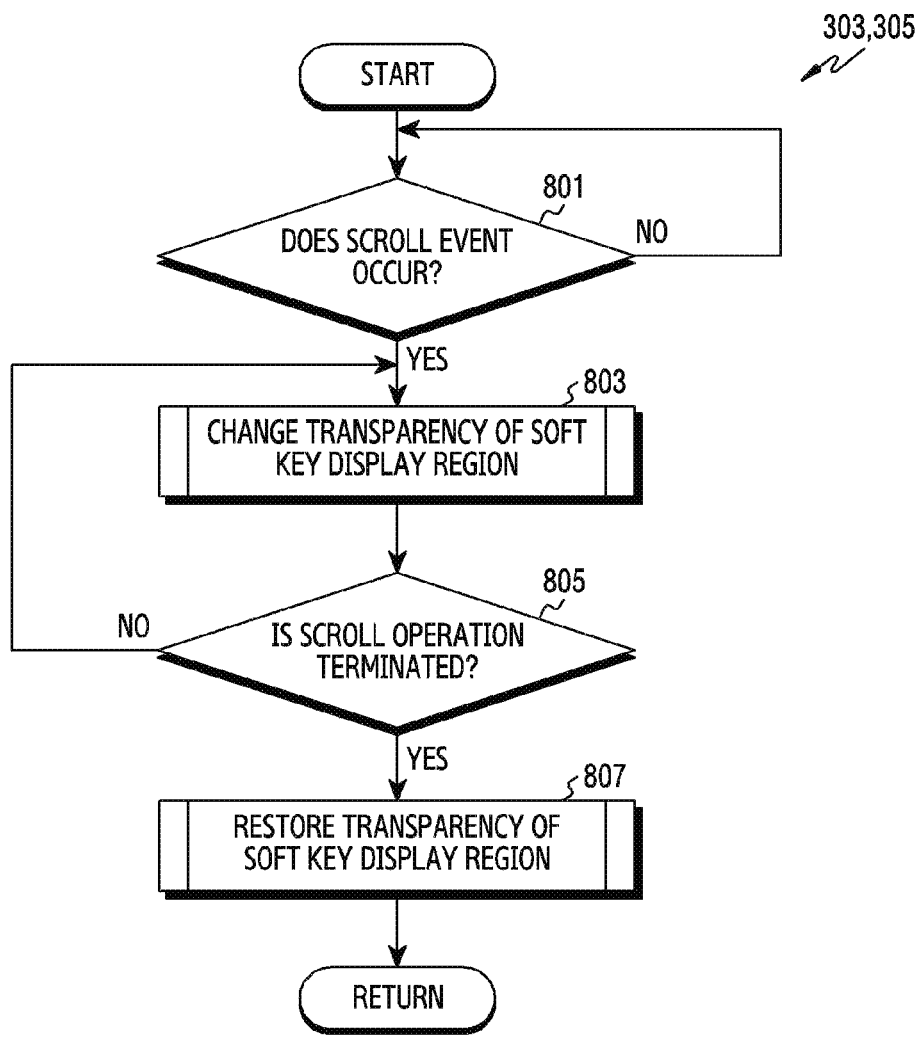
FIG. 8 illustrates a flowchart for controlling a transparency of a soft key display region in an electronic device according to various embodiments of the present disclosure.

FIG. 8 illustrates a flowchart for controlling a transparency of a soft key display region in an electronic device according to various embodiments of the present disclosure. The following description is about an operation of changing the execution screen of the application in operation 303 of FIG. 3 and an operation of changing a graphic attribute of a soft key display region based on the change in the execution screen of the application in operation 305 of FIG. 3. In the following description, the electronic device may include all or some parts (e.g., the processor 120) of the electronic device 101 of FIG. 1.

Referring to FIG. 8, in operation 801, the electronic device may determine whether a scroll event occurs. For example, the processor 120 of the electronic device 101 may determine whether the scroll event occurs based on a signal corresponding to a user input provided via the input/output interface 150 or the display 160. For another example, the processor 120 may determine whether the scroll event occurs based on a signal corresponding to a user input received via the communication interface 170. If the scroll event does not occur, the processor 120 may repeat operation 801 for determining whether the scroll event occurs.

In operation 803, if the screen event occurs, the electronic device may change a transparency of the soft key display region. For example, if the execution screen of the application is scrolled, the processor 120 may control the display 160 to display the soft key display region with a predefined transparency (e.g., 70%). For another example, if the execution screen of the application is scrolled, the processor 120 may confirm a change variable (e.g., a movement direction, a movement speed, a movement time, a movement distance, etc.) for the execution screen of the application. The processor 120 may determine the transparency based on the change variable of the execution screen of the application. The processor 120 may control the display 160 to display the transparency of the soft key display region with the transparency determined based on the change variable. For example, the processor 120 may control the display 160 such that the greater the value of the movement speed, movement time, or movement distance of the execution screen of the application, the more transparent the soft key display region to be displayed. For example, if the movement direction of the execution screen of the application is a pre-defined direction, the processor 120 may control the display 160 such that the greater the value of the movement speed, movement time, or movement distance of the execution screen of the application, the more transparent the soft key display region to be displayed.

In operation 805, the electronic device may determine whether the scroll operation of the execution screen of the application is terminated. For example, the processor 120 may determine whether the scroll operation of the execution screen of the application is terminated based on a signal corresponding to a user input provided via the display 160. If the scroll operation of the execution screen of the application is not terminated, the processor 120 may repeat operation 803 in which the transparency of the soft key display region is changed.

In operation 807, if the scroll operation of the execution screen of the application is terminated, the electronic device may restore the transparency of the soft key display region. For example, if all scroll operations based on the generation of the scroll event are performed and thus the execution screen of the application is no longer scrolled, the processor 120 may control the display 160 so that the transparency of the soft key display region is restored to a previous transparency used before the scroll event occurs.

Although it has been described above that the electronic device changes the transparency of the soft key display region if the scroll event occurs in operation 803, according to various embodiments of the present disclosure, if the scroll event occurs in operation 803, the electronic device may selectively change the transparency of the soft key display region based on whether the execution screen of the application overlaps with the soft key display region. For example, if the execution screen of the application overlaps with the soft key display region, the processor 120 may control the display 160 to increase the transparency of the soft key display region based on the change variable of the execution screen of the application. For another example, if the execution screen of the application is separated from the soft key display region, the processor 120 may control the display 160 to maintain the transparency of the soft key display region. Additionally or alternatively, if the execution screen of the application is separated from the soft key display region, the processor 120 may control the display 160 such that the transparency of the soft key display region becomes high based on the change variable of the execution screen of the application. In this case, the processor 120 may extend a size of the execution screen of the application such that the execution screen of the application and the soft key display region are displayed in an overlapping manner.

Figure 9:
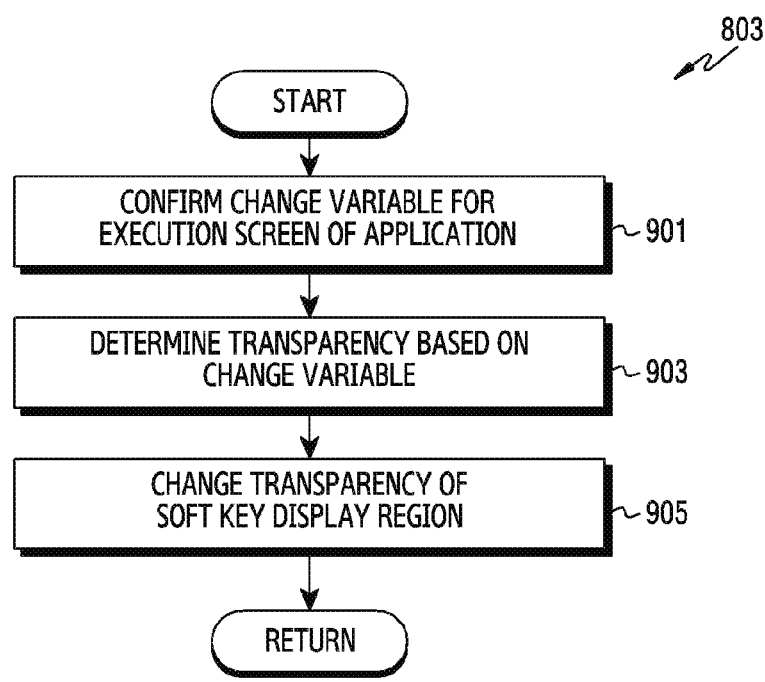
FIG. 9 illustrates a flowchart for changing a transparency of a soft key display region in an electronic device according to various embodiments of the present disclosure.

FIG. 9 illustrates a flowchart for changing a transparency of a soft key display region in an electronic device according to various embodiments of the present disclosure.

FIGS. 10A to 10E illustrate screen configurations for changing a transparency of a soft key display region in an electronic device according to various embodiments of the present disclosure. The following description is about an operation of changing the transparency of the soft key display region in operation 803 of FIG. 8. In the following description, the electronic device may include all or some parts (e.g., the processor 120) of the electronic device 101 of FIG. 1.

Figure 10A:
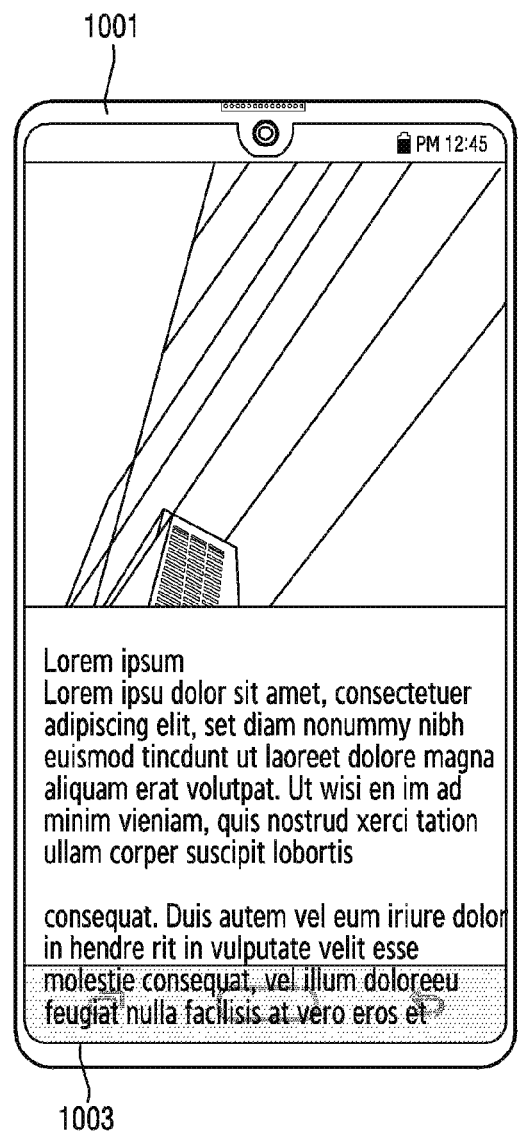
FIGS. 10A, 10B, 10C, 10D, and 10E illustrate screen configurations for changing a transparency of a soft key display region in an electronic device according to various embodiments of the present disclosure.
Figure 10B:
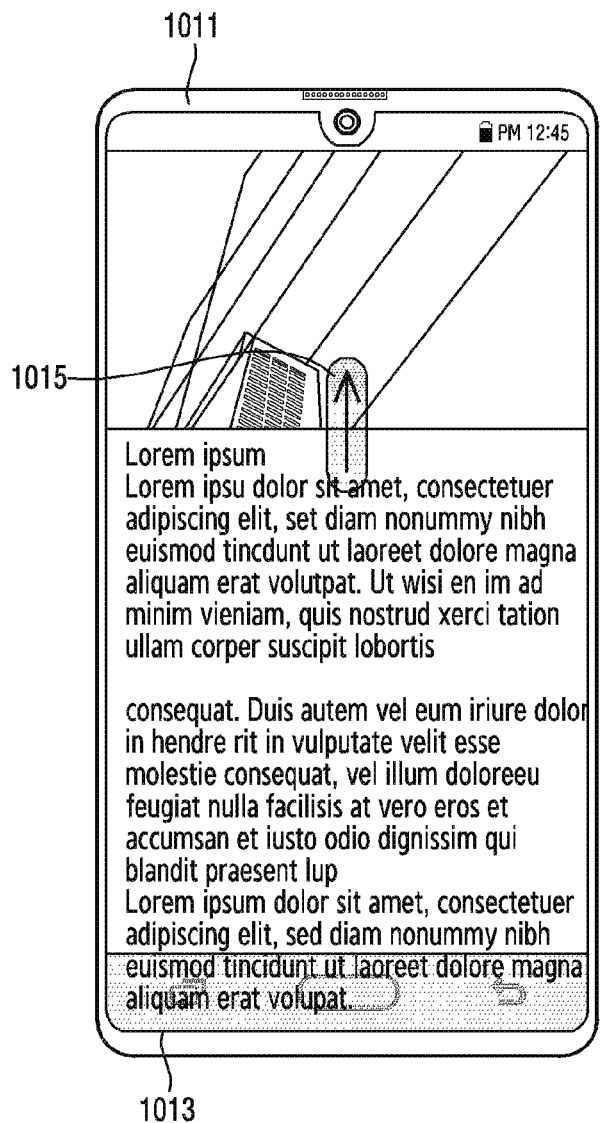

Referring to FIG. 9, in operation 901, the electronic device may confirm a change variable for the execution screen of the application. For example, as shown in FIG. 10A, in a state where an execution screen 1001 of the application is being displayed by overlapping with a soft key display region 1003, as shown in FIG. 10B, the processor 120 of the electronic device 101 may confirm the change variable of an execution screen 1011 of the application which is scrolled according to a first scroll input 1015. Herein, the change variable may include at least one of a movement direction, movement speed, movement time, or movement distance of the application to be scrolled.

In operation 903, the electronic device may determine a transparency based on the change variable. For example, as shown in FIG. 10B, the processor 120 may determine the transparency based on at least one of a movement direction, movement speed, movement time, or movement distance of the execution screen 1011 of the application to be scrolled. For example, if the execution screen 1011 of the application is scrolled, the processor 120 may determine a pre-set transparency (e.g., 70%). For example, if the execution screen 1011 of the application is switched to a pre-set direction (e.g., an upward direction, a downward direction, a left direction, a right direction) according to the scroll operation, the processor 120 may determine the transparency based on at least one of the movement speed, movement time, or movement distance of the execution screen 1011 of the application. In this case, the processor 120 may determine a transparency such that the greater the value of the movement speed, movement time, and movement distance of the execution screen 1011 of the application, the higher the value thereof. For example, after the transparency is determined based on at least one of the movement speed, movement time, or movement distance of the execution screen 1011 of the application, the processor 120 may apply a weight based on the movement direction of the execution screen of the application to the transparency.

Figure 10C:
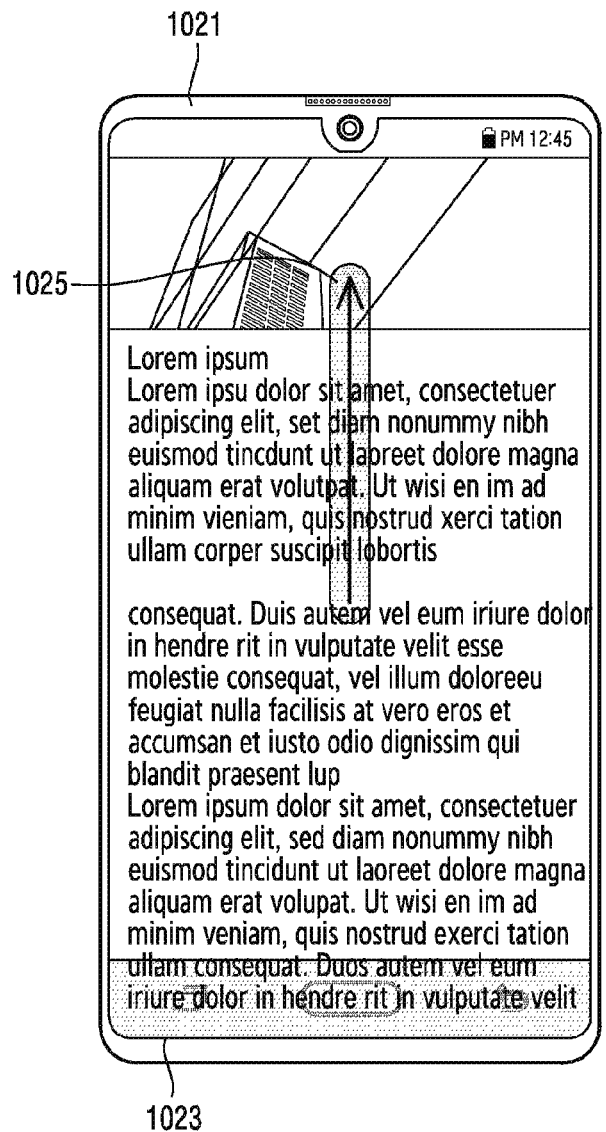
Figure 10D:
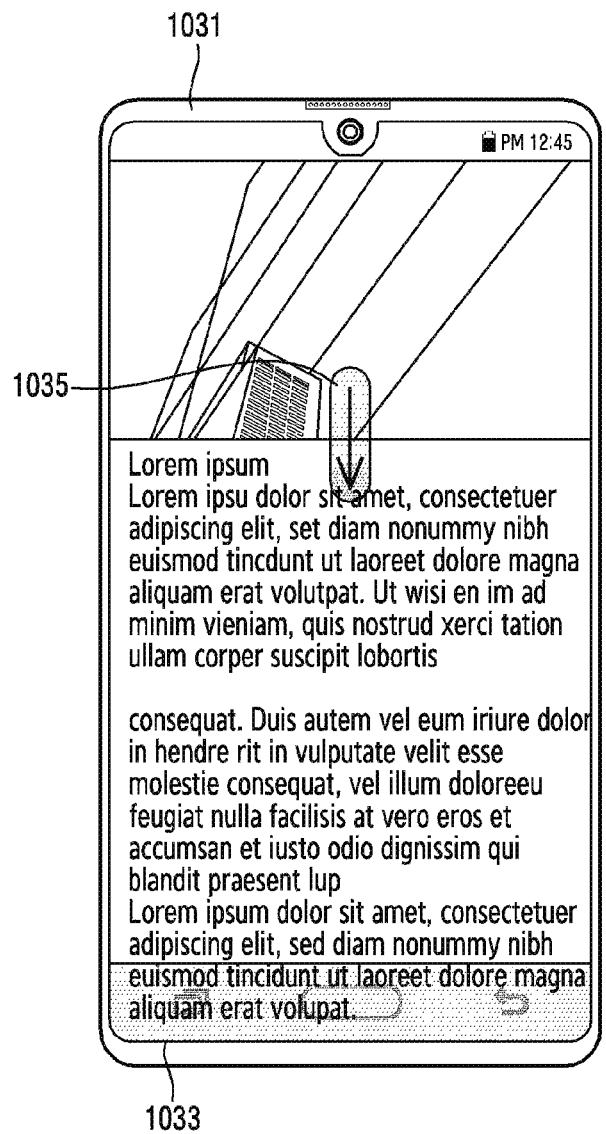
Figure 10E:
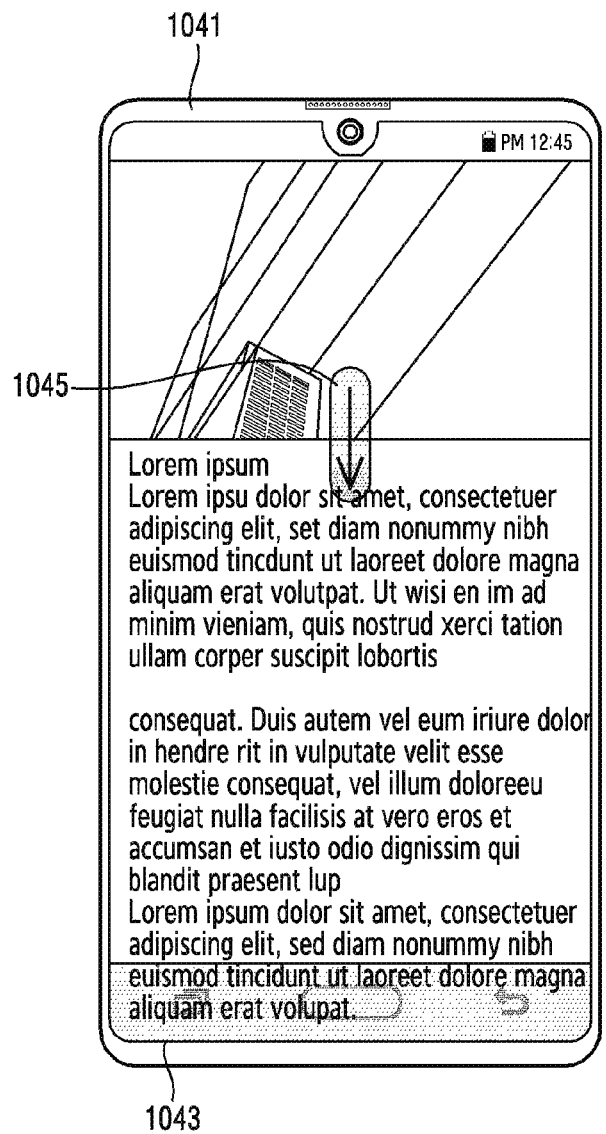

In operation 905, the electronic device may change the transparency of the soft key display region. For example, as shown in FIG. 10B, if the execution screen 1011 of the application is scrolled by a first distance in an upward direction according to a first scroll input 1015, the processor 120 may control the display 160 to display a soft key display region 1013 with a transparency determined based on the first distance. For another example, as shown in FIG. 10C, if the execution screen 1021 of the application is scrolled by a second distance in an upward direction according to a second scroll input 1025, the processor 120 may control the display 160 to display a soft key display region 1023 with a transparency determined based on the second distance. For another example, as shown in FIG. 10D, if an execution screen 1031 of the application is scrolled by a first distance in a downward direction according to a third scroll input 1035, the processor 120 may control the display 160 to display a soft key display region 1033 with a transparency corresponding to the first distance. For another example, as shown in FIG. 10E, if an execution screen 1041 of the application is scrolled by a first distance in a downward direction according to a fourth screen input 1045, the processor 120 may control the display 160 such that a transparency of a soft key display region 1043 is not changed. Herein, the movement distance may be acquired based on a scroll input before a screen operation is performed on the execution screen of the application.

Figure 11:
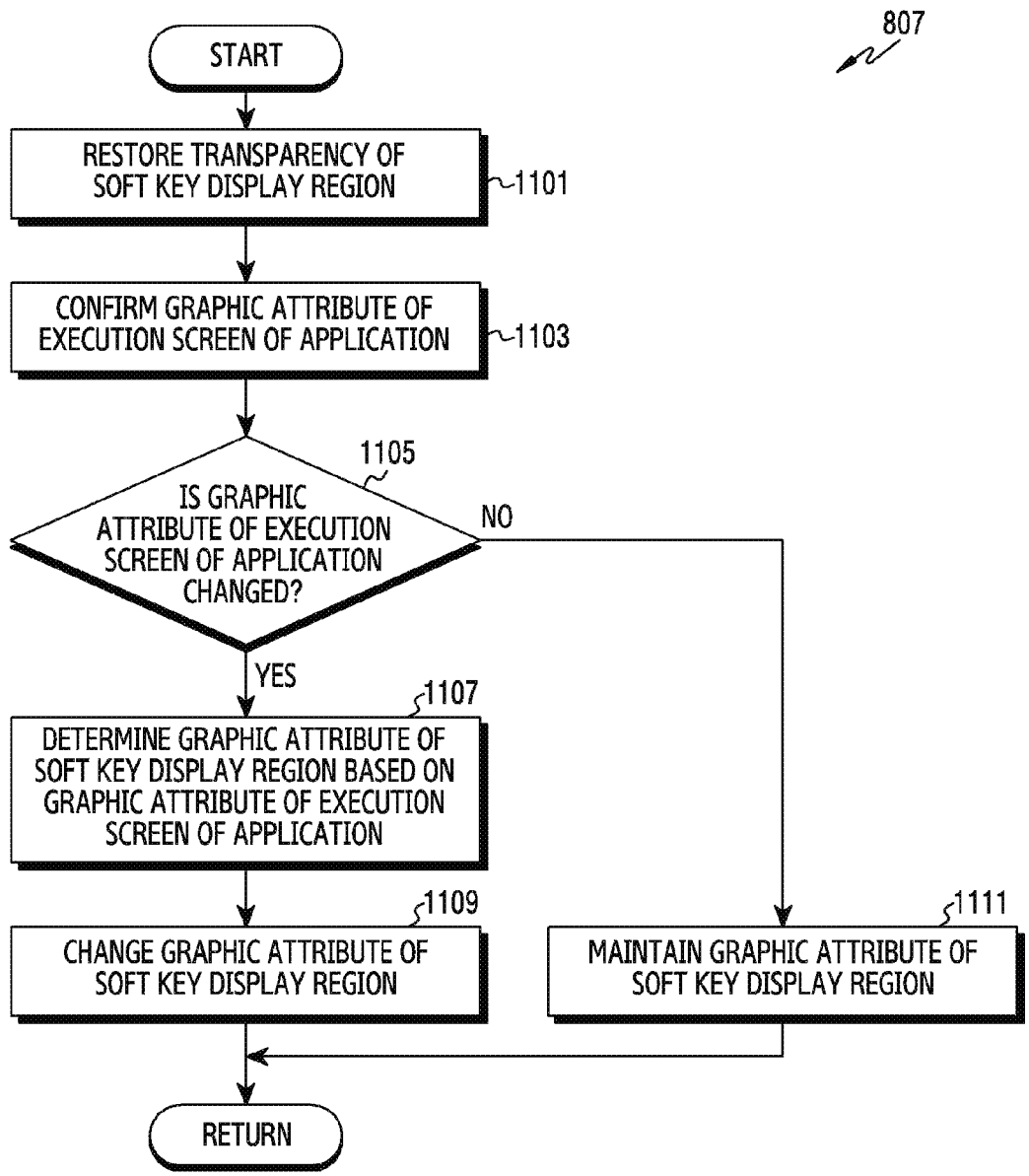
FIG. 11 illustrates a flowchart for controlling a graphic attribute of a soft key display region in an electronic device according to various embodiments of the present disclosure.

FIG. 11 illustrates a flowchart for controlling a graphic attribute of a soft key display region in an electronic device according to various embodiments of the present disclosure. The following description is about an operation of restoring a transparency of a soft key display region in operation 807 of FIG. 8. In the following description, the electronic device may include all or some parts (e.g., the processor 120) of the electronic device 101 of FIG. 1.

Referring to FIG. 11, in operation 1101, the electronic device may restore the transparency of the soft key display region. For example, when the scroll operation is terminated, the processor 120 of the electronic device 101 may control the display 160 to restore the transparency of the soft key display region changed according to the occurrence of the scroll event to a previous transparency used before the scroll event occurs.

In operation 1103, the electronic device may confirm the graphic attribute of the execution screen of the application in response to the restoration of the transparency of the soft key display region. For example, if the execution screen of the application and the soft key display region are displayed in an overlapping manner, the processor 120 may extract color from at least one pixel among a plurality of pixels included in the region overlapping with the soft key display region in the execution screen of the application. For another example, if the execution screen of the application and the soft key display region are displayed in a separated manner, the processor 120 may determine a region having the same size as the soft key display region as a detection region in a region adjacent to the soft key display region in the execution screen of the application. The processor 120 may extract color from at least one pixel among a plurality of pixels included in the detection region.

In operation 1105, the electronic device may determine whether there is a change in the graphic attribute of the execution screen of the application. For example, the processor 120 may determine whether color extracted from at least one pixel among the plurality of pixels included in the region overlapping with the soft key display region in the execution screen of the application is different from color extracted before the generation of the scroll event. For another example, the processor 120 may determine whether the color extracted from at least one pixel among the plurality of pixels included in the detection region is different from the color extracted before the generation of the scroll event.

In operation 1107, if the graphic attribute of the execution screen of the application is changed, the electronic device may determine the graphic attribute of the soft key display region based on the graphic attribute of the execution screen of the application. For example, the processor 120 may determine representative color based on the color extracted from the at least one pixel among the plurality of pixels included in the region overlapping with the soft key display region in the execution screen of the application. The processor 120 may determine the determined representative color as the color of the soft key display region. For another example, the processor 120 may determine the representative color based on the color extracted from the at least one pixel among the plurality of pixels included in the detection region. The processor 120 may determine the determined representative color as the color of the soft key display region.

In operation 1109, the electronic device may change the graphic attribute of the soft key display region. For example, if the execution screen of the application and the soft key are displayed in a separated manner, the processor 120 may control the display 160 to display the soft key display region in the representative color. For another example, if the execution screen of the application and the soft key are displayed in an overlapping manner, the processor 120 may control the display 160 to display the soft key display region in the representative color of which a transparency is changed, after changing the transparency of the representative color to a pre-defined value (e.g., 70%).

In operation 1111, if there is no change in the graphic attribute of the execution screen of the application, the electronic device may maintain the graphic attribute of the soft key display region. For example, if the color extracted from the at least one pixel among the plurality of pixels included in the region overlapping with the soft key display region in the execution screen of the application is the same as the color extracted from the generation of the screen event, the processor 120 may control the display 160 to maintain the color of the soft key display region. For another example, if the color extracted from the at least one pixel among the plurality of pixels included in the detection region is the same as the color extracted before the generation of the scroll event, the processor 120 may control the display 160 to maintain the color of the soft key display region.

Figure 12:
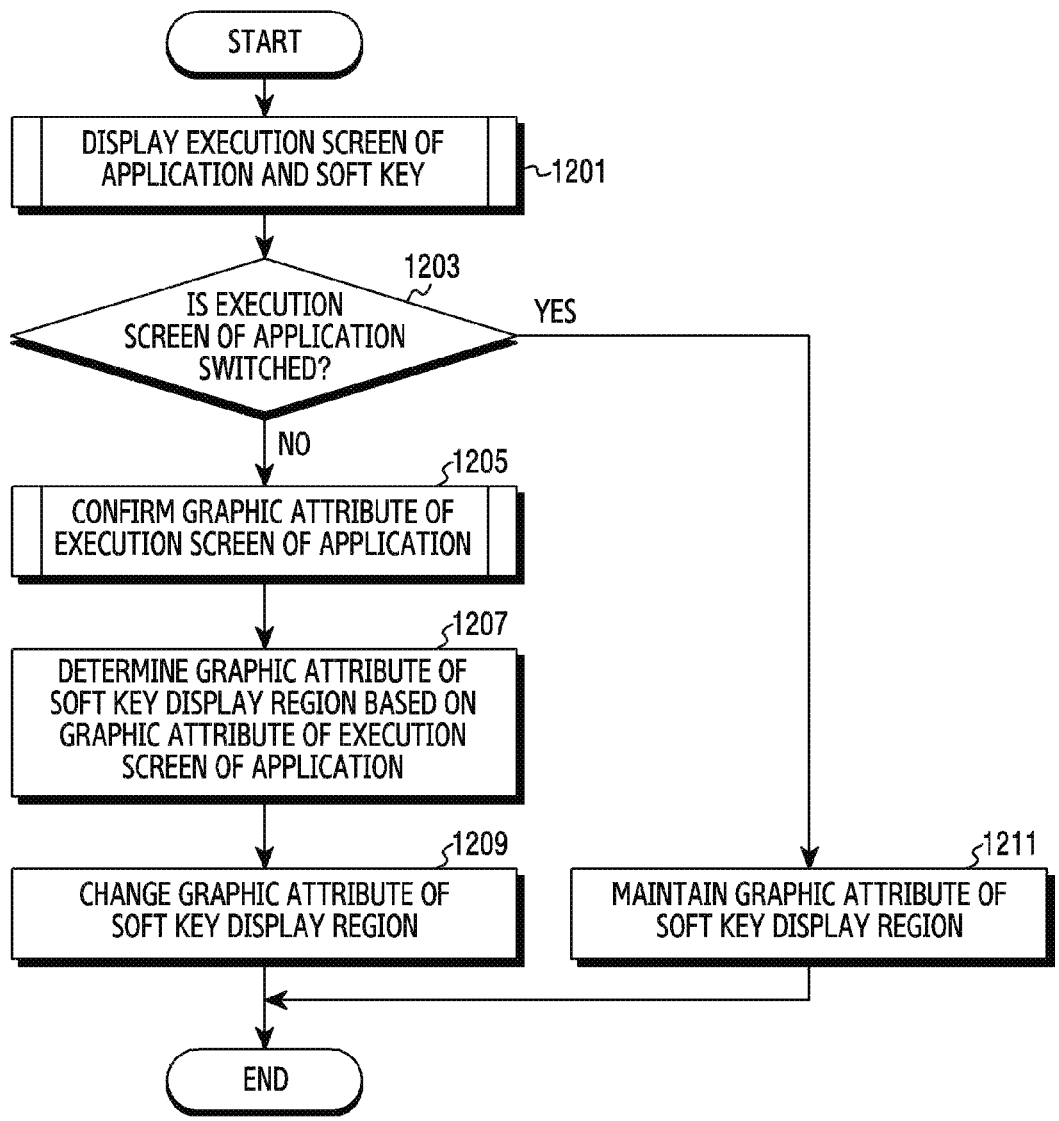
FIG. 12 illustrates a flowchart for a display control of a soft key in an electronic device according to various embodiments of the present disclosure.
Figure 13A:
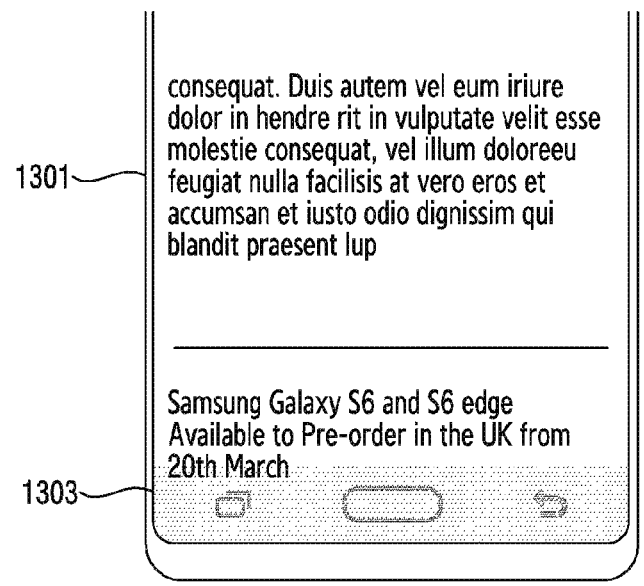
FIGS. 13A and 13B illustrate screen configurations in which a soft key is displayed in an electronic device according to various embodiments of the present disclosure.
Figure 13B:
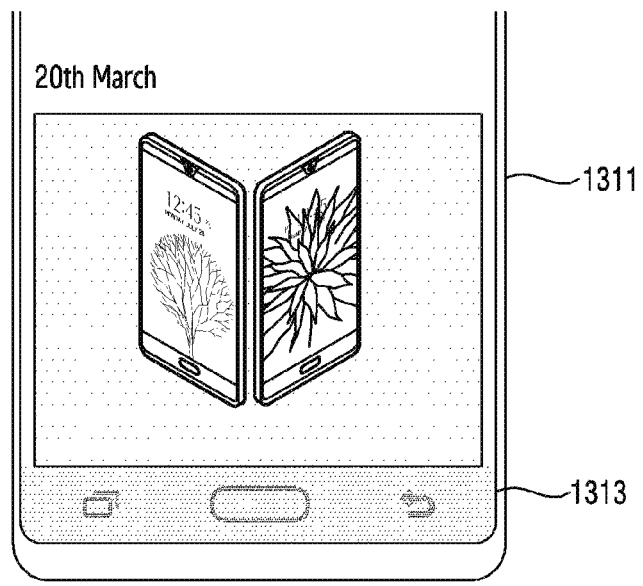

FIG. 12 illustrates a flowchart for a display control of a soft key in an electronic device according to various embodiments of the present disclosure. FIGS. 13A and 13B illustrate screen configurations in which a soft key is displayed in an electronic device according to various embodiments of the present disclosure. In the following description, the electronic device may include all or some parts (e.g., the processor 120) of the electronic device 101 of FIG. 1.

Referring to FIG. 12, in operation 1201, the electronic device may display an execution screen of an application and a soft key. For example, as shown in FIG. 4, if the application is executed, the processor 120 of the electronic device 101 may confirm a graphic attribute of the execution screen of the application. The processor 120 may determine a graphic attribute of the soft key display region based on the graphic attribute of the execution screen of the application. The processor 120 may control the display 160 to display the execution screen of the application and the soft key based on the graphic attribute of the soft key display region. For example, the processor 120 may control the display 160 such that the execution screen of the application and the soft key are displayed in an overlapping manner or in a separated manner based on a size of the execution screen of the application.

In operation 1203, the electronic device may determine whether the execution screen of the application is switched. For example, the processor 120 may determine whether the screen event occurs based on a signal corresponding to a user input provided via the input/output interface 150 or the display 160. If the scroll event occurs, the processor 120 may determine that the execution screen of the application is switched. For another example, the processor 120 may determine whether the scroll event occurs based on the signal corresponding to the user input received via the communication interface 170. If the scroll event occurs, the processor 120 may determine that the execution screen of the application is switched.

In operation 1205, if the execution screen of the application is not switched, the electronic device may confirm the graphic attribute of the execution screen of the application. For example, as shown in operation 603 of FIG. 6, if the scroll operation of the execution screen of the application with a size greater than or equal to a reference size is terminated, the processor 120 may extract color from at least one pixel among a plurality of pixels included in a region overlapping with the soft key display region in the execution screen of the application. For another example, as shown in operations 605 and 607 of FIG. 6, if the scroll operation of the execution screen of the application with a size less than the reference size is terminated, the processor 120 may determine a detection region in a region adjacent to the soft key display region in the execution screen of the application. The processor 120 may extract the color from the at least one pixel among the plurality of pixels included in the detection region.

In operation 1207, the electronic device may determine the graphic attribute of the soft key display region based on the graphic attribute of the execution screen of the application. For example, the processor 120 may change the extracted color into an RGB value or an HSV value. The processor 120 may determine any one of average color of which a sum of color differences of the converted RGB values or the HSV values is minimum and most frequent color which is the most frequently occurring color among the changed RGB values or the HSV values as representative color. The processor 120 may determine the determined representative color as the color of the soft key display region.

In operation 1209, the electronic device may change the graphic attribute of the soft key display region. For example, as shown in FIG. 13A, if an execution screen 1301 of an application and a soft key display region 1303 are displayed in a separated manner, the processor 120 may control the display 160 to display the soft key display region 1303 in the representative color. For another example, as shown in FIG. 13B, if an execution screen 1311 of an application and a soft key display region 1313 are displayed in an overlapping manner, the processor 120 may control the display 160 to display the soft key display region 1313 in the representative color of which a transparency is changed, after changing the transparency of the representative color to a pre-defined value (e.g., 70%).

In operation 1211, if the execution screen of the application is switched, the electronic device may maintain the graphic attribute of the soft key display region. For example, if a scroll operation is performed on the execution screen of the application, the processor 120 may control the display 160 to display the soft key display region by maintaining color thereof.

Figure 14:
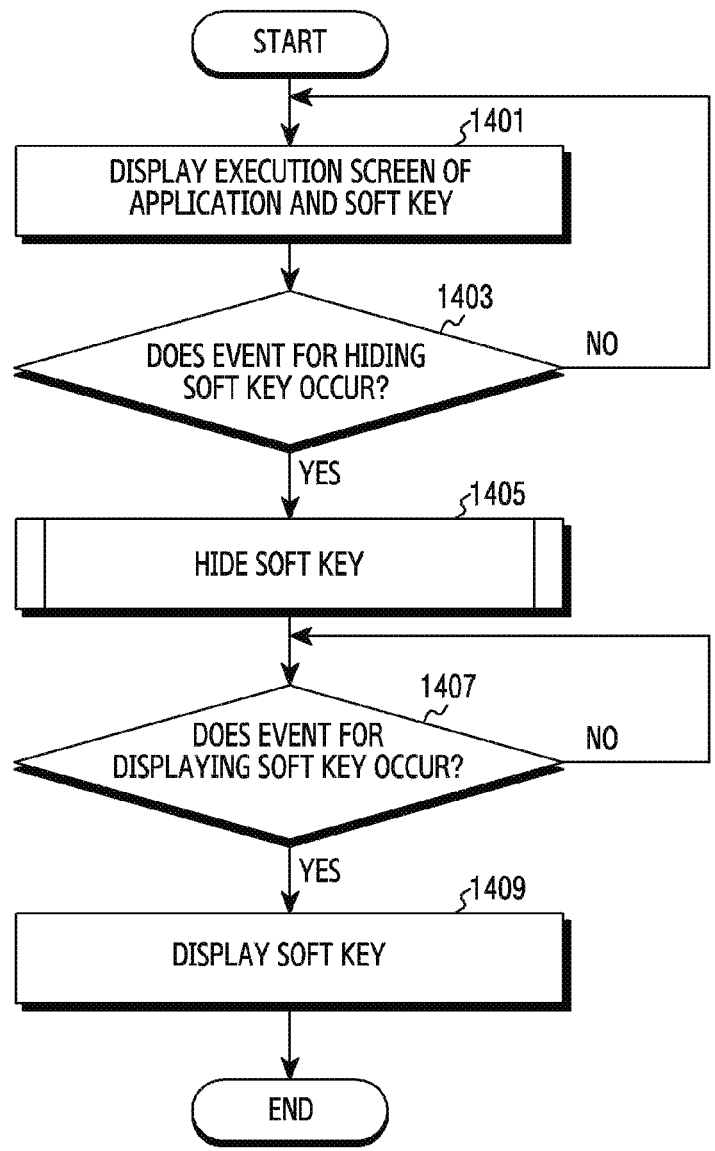
FIG. 14 is a flowchart for a display control of a soft key in an electronic device according to various embodiments of the present disclosure.

FIG. 14 illustrates a flowchart for a display control of a soft key in an electronic device according to various embodiments of the present disclosure.

FIGS. 15A to 15D illustrate screen configurations for a display control of a soft key in an electronic device according to various embodiments of the present disclosure. In the following description, the electronic device may include all or some parts (e.g., the processor 120) of the electronic device 101 of FIG. 1.

Figure 15A:
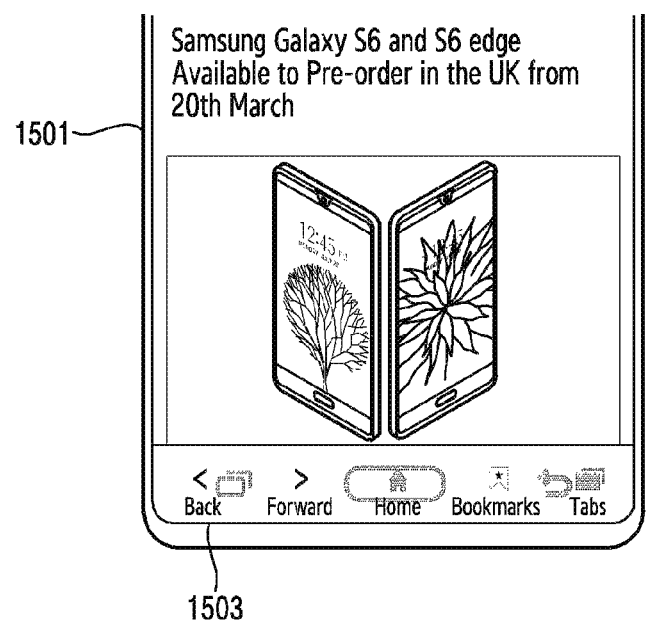
FIGS. 15A, 15B, 15C, and 15D illustrate screen configurations for a display control of a soft key in an electronic device according to various embodiments of the present disclosure.

Referring to FIG. 14, in operation 1401, the electronic device may display an execution screen of an application and a soft key. For example, as shown in FIG. 4, if the application is executed, the processor 120 of the electronic device 101 may determine a graphic attribute of the soft key display region based on a graphic attribute of the execution screen of the application. The processor 120 may control the display 160 to display the execution screen of the application and the soft key based on the graphic attribute of the soft key display region. For example, as shown in FIG. 15A, the processor 120 may control the display 160 such that an execution screen 1501 of an application and a soft key display region 1503 are displayed in an overlapping manner. For example, the processor 120 may control the display 160 such that the execution screen of the application and the soft key display region are displayed in a separated manner.

Figure 15B:
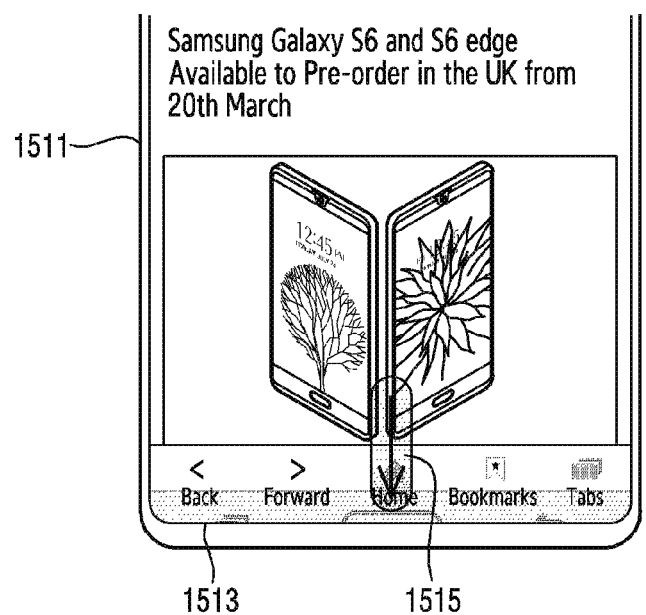

In operation 1403, the electronic device may determine whether an event for hiding a soft key occurs. For example, as shown in FIG. 15B, in a state where an execution screen 1511 of an application and a soft key display region 1513 are displayed in an overlapping manner, the processor 120 may detect an input 1515 for hiding the soft key display region. Upon detection of the input 1515 for hiding the soft key display region, the processor 120 may determine that the event for hiding the soft key occurs.

Figure 15C:
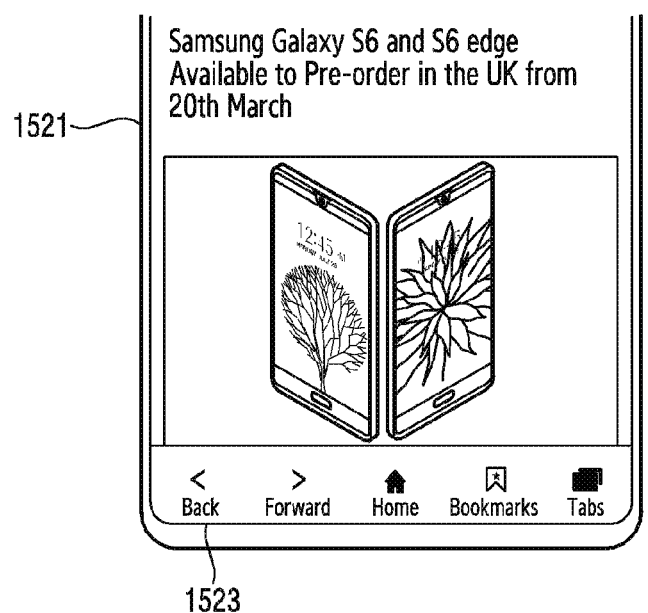

In operation 1405, if the event for hiding the soft key occurs, the electronic device may hide the soft key. For example, if the event for hiding the soft key occurs, as shown in FIG. 15C, the processor 120 may control the display 160 to display only an execution screen 1521 of an application. For example, if function keys 1523 are located in a region overlapping with the soft key display region in the execution screen 1521 of the application, the processor 120 may activate the function keys 1523 when the soft key display region is hidden. For example, if a user input for the function keys 1523 is detected via the input/output interface 150 or the display 160 in a state where the soft key display region is hidden, the processor 120 may execute a function mapped to a function key corresponding to the user input. Herein, if the function keys 1523 are hidden by the soft key display region, an inactivation state may be maintained.

According to an embodiment, if the soft key display region is hidden, the processor 120 may display a menu bar including a function key corresponding to an attribute of an application at a position where the soft key display region is previously displayed. For example, if the soft key display region is hidden, the processor 120 may confirm an attribute (e.g., a function) of an application currently being displayed on the display 160. The processor 120 may generate a menu bar including a function key corresponding to the attribute of the application currently being displayed on the display 160. The processor 120 may display the generated menu bar at the position where the soft key display region is previously displayed.

Figure 15D:
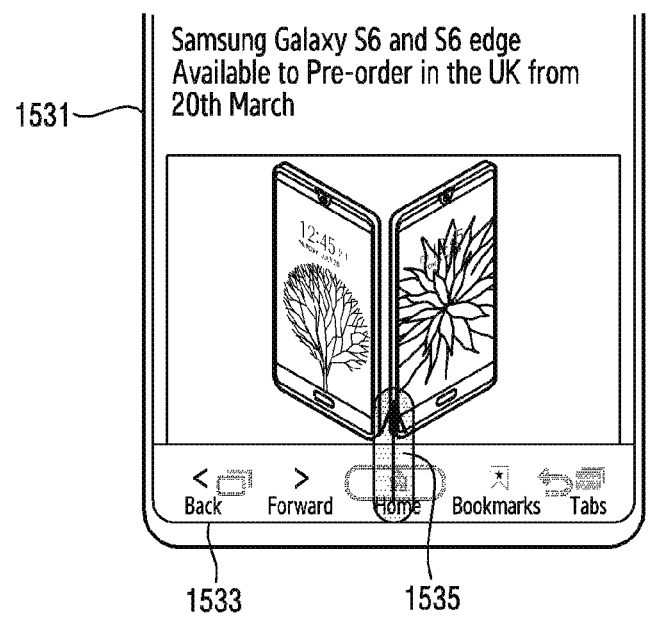

In operation 1407, whether the event for displaying the soft key occurs may be determined. For example, as shown in FIG. 15D, the processor 120 may detect a user input 1535 for displaying the soft key via the input/output interface 150 or the display 160 in a state where an execution screen 1531 of an application is displayed. If the input 1535 for displaying the soft key is detected, the processor 120 may determine that the event for displaying the soft key occurs. For another example, as shown in FIG. 15D, the processor 120 may receive the user input 1535 for displaying the soft key via the communication interface 170 in the state where the execution screen 1531 of the application is displayed. If the input 1535 for displaying the soft key is received, the processor 120 may determine that the event for displaying the soft key occurs. If the event for displaying the soft key does not occur, the processor 120 may persistently confirm whether the event for displaying the soft key occurs.

In operation 1409, if the event for displaying the soft key occurs, the electronic device may display the soft key. For example, if the input for displaying the soft key is detected via the input/output interface 150 or the display 160, as shown in FIG. 15D, the processor 120 may display a soft key display region 1533 together with the execution screen 1531 of the application. For another example, if the input for displaying the soft key is received via the communication interface 170, as shown in FIG. 15D, the processor 120 may display the soft key display region 1533 together with the execution screen 1531 of the application.

Figure 16:
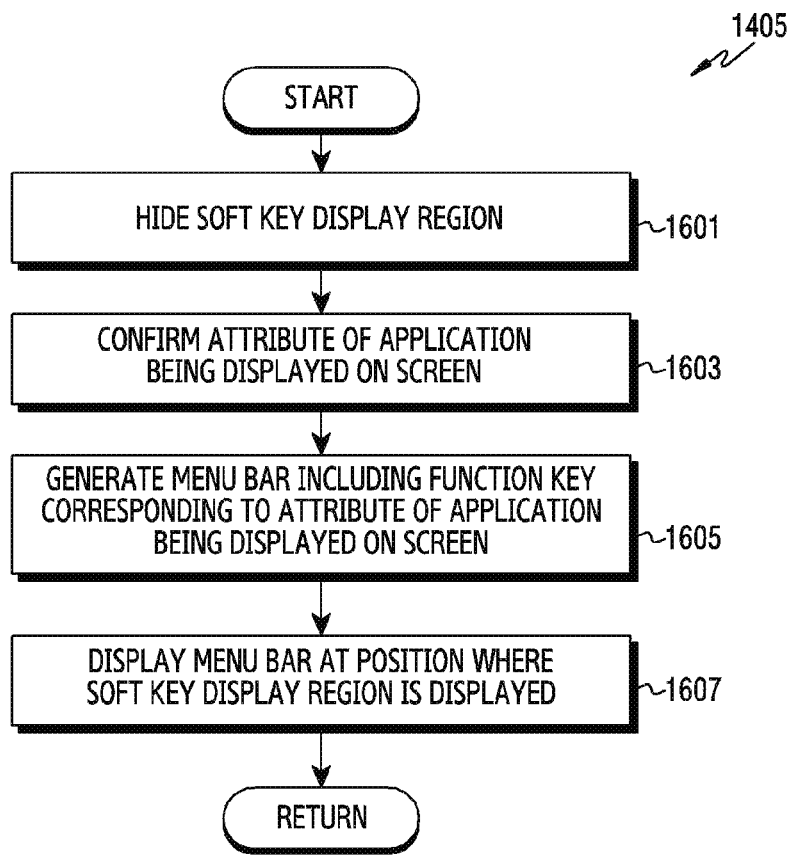
FIG. 16 illustrates a flowchart for displaying a menu bar including a function key corresponding to an attribute of an application in an electronic device according to various embodiments of the present disclosure.

FIG. 16 illustrates a flowchart for displaying a menu bar including a function key corresponding to an attribute of an application in an electronic device according to various embodiments of the present disclosure.

Figure 17A:
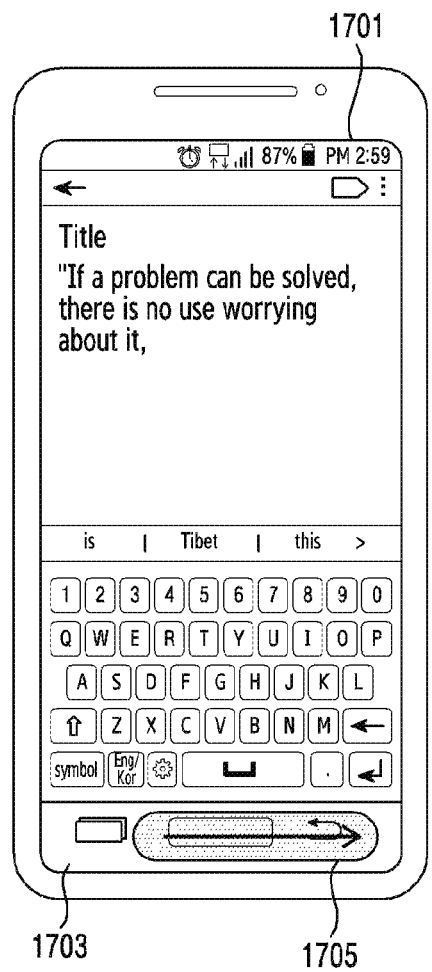
FIGS. 17A, 17B, and 17C illustrate screen configurations for displaying a menu bar including a function key corresponding to an attribute of an application in an electronic device according to various embodiments of the present disclosure.
Figure 17B:
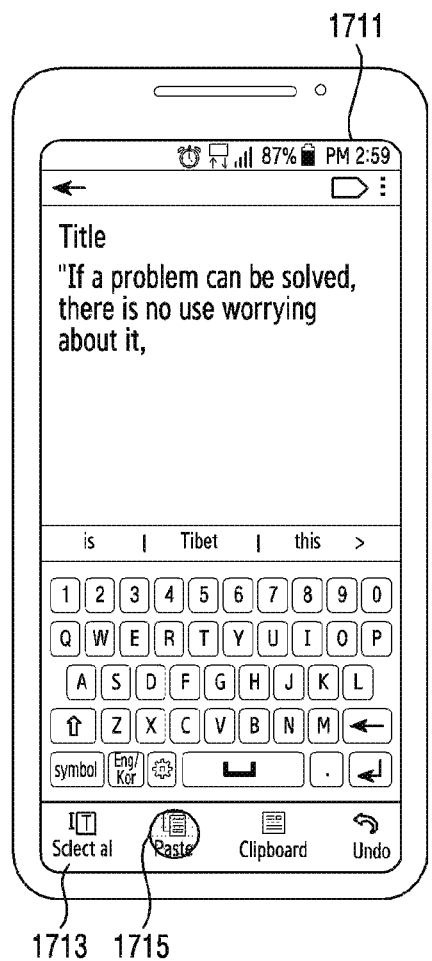
Figure 17C:
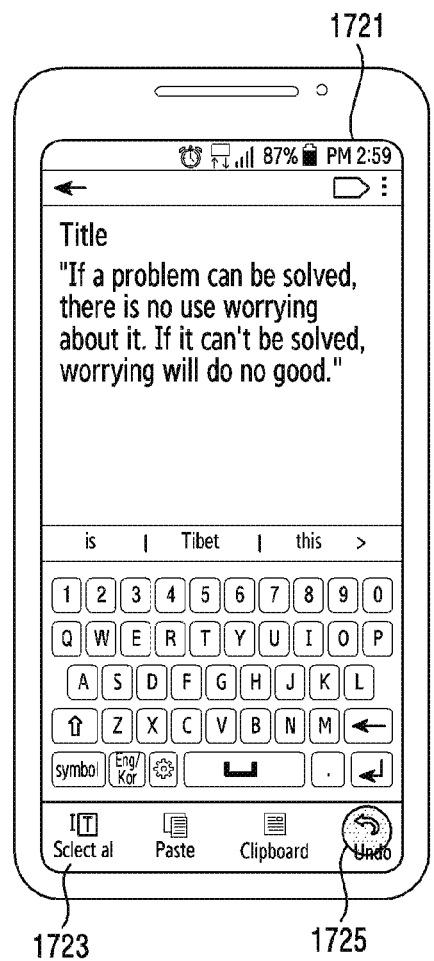

FIGS. 17A to 17C illustrate screen configurations for displaying a menu bar including a function key corresponding to an attribute of an application in an electronic device according to various embodiments of the present disclosure.

Figure 18A:
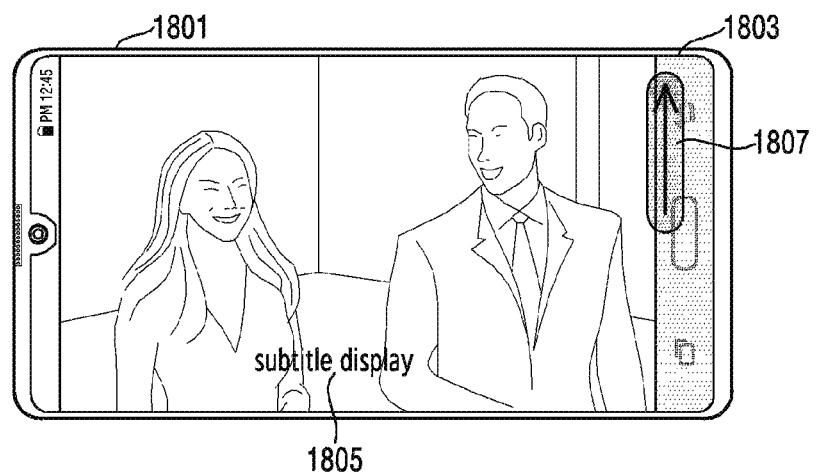
FIGS. 18A, 18B, and 18C illustrate screen configurations for utilizing a soft key display region in an electronic device according to various embodiments of the present disclosure.
Figure 18B:
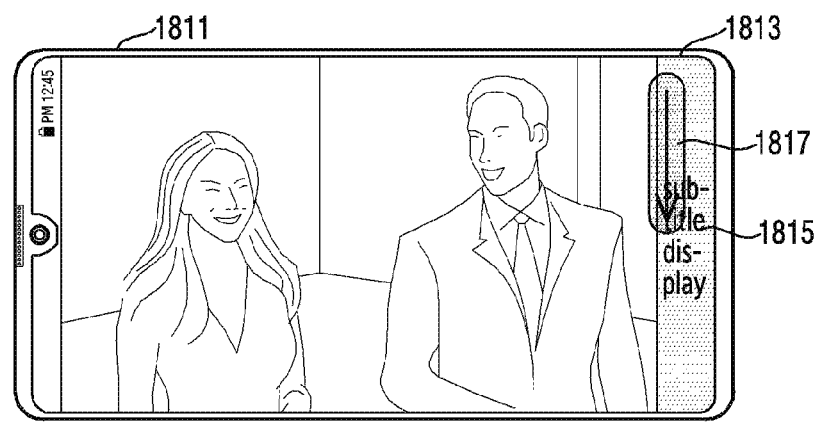
Figure 18C:
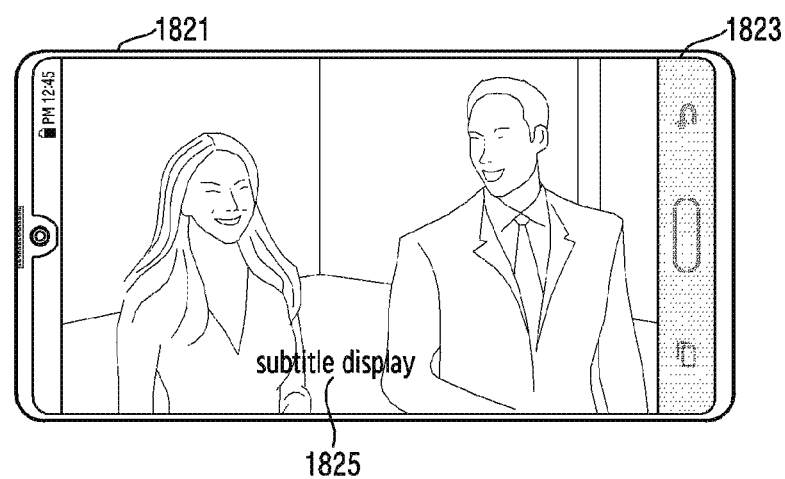

FIGS. 18A to 18C illustrate screen configurations for utilizing a soft key display region in an electronic device according to various embodiments of the present disclosure. The following description is about an operation of hiding the soft key in operation 1405 of FIG. 14. In the following description, the electronic device may include all or some parts (e.g., the processor 120) of the electronic device 101 of FIG. 1.

Referring to FIG. 16, in operation 1601, the electronic device may hide a soft key display region. For example, as shown in FIG. 17A, in a state where an execution screen 1701 of an application and a soft key display region 1703 are display in a separated manner, the processor 120 of the electronic device 101 may detect an input 1705 for hiding the soft key display region via the display 160. If the input 1705 for hiding the soft key display region is detected, the processor 120 may control the display 160 to hide the soft key display region.

In operation 1603, the electronic device may confirm an attribute of an application currently being displayed on a screen. For example, the processor 120 may confirm a function (e.g., messages, web search, games, music, movie, etc.) performed by the application currently being displayed on the display 160.

In operation 1605, the electronic device may generate a menu bar including a function key corresponding to an attribute of an application currently being displayed on a screen. For example, as shown in FIG. 17B, if the application currently being displayed on the display 160 performs a message function, the processor 120 may generate a menu bar 1713 including various function keys (e.g., a selection key, a paste key, a copy key, an undo key, etc.) related to a message writing function.

In operation 1607, the electronic device may display the menu bar at a position where the soft key display region is previously displayed. For example, as shown in FIG. 17B, the processor 120 may control the display 160 such that the menu bar 1713 including a function key corresponding to an attribute of an application currently being displayed is displayed by being separated from an execution screen 1711 of the application.

According to an embodiment, if a user input for the function key included in the menu bar is detected, the electronic device may perform a function of the function key corresponding to the user input. For example, as shown in FIG. 17B, if a touch input 1715 for a paste key is detected from the menu bar 1713, as shown in FIG. 17C, the processor 120 may control the display 160 such that data stored in the memory 130 is displayed on an execution screen 1721 of an application according to a clipboard input. If a user input 1725 for an undo key of a menu bar 1723 is detected via the display 160 in a state where the execution screen 1721 of an application is displayed, as shown in FIG. 17B, the processor 120 may control the display 160 to display the execution screen 1711 of the application in which added data is deleted.

According to an embodiment, if a soft key indication event occurs in a state where the menu bar is being displayed, the electronic device may hide the displayed menu bar. For example, the processor 120 may detect the event for displaying the soft key based on a signal output via the display 160 in a state where the execution screen of the application and the menu bar are being displayed. If the event for displaying the soft key is detected, the processor 120 may control the display 160 to display the soft key display region at a position where the menu bar is previously displayed, after hiding the menu bar.

Although it is described above that, if the soft key display region is hidden, the electronic device displays the menu bar including the function key corresponding to the attribute of the application at the position where the soft key display region is previously displayed, according to various embodiments of the present disclosure, if the soft key display region is hidden, the electronic device may display one part of content provided by the application at the position where the soft key display region is previously displayed. For example, as shown in FIG. 18A, the processor 120 may detect an input 1807 for hiding a soft key display region 1803 in a state where the electronic device 101 is displaying an image 1801 and a subtitle 1805 via the display 160. In response to the input 1807 for hiding the soft key display region 1803, as shown in FIG. 18B, the processor 120 may control the display 160 to display an image 1811 and a subtitle 1815 at a position 1813 where the soft key display region is previously displayed after hiding the soft key display region. If an input 1817 for displaying the soft key display region is detected in a state where the subtitle 1815 is displayed at the position where the soft key display region is displayed, as shown in FIG. 18C, the processor 120 may display an image 1821 and a soft key display region 1823 together. In this case, the processor 120 may control the display 160 such that a subtitle 1825 previously displayed at the position of the soft key display region 1823 is displayed at a position where the soft key display region 1823 is displayed before being hidden.

According to various embodiments of the present disclosure, a method of operating an electronic device may include displaying an execution screen of an application and a soft key, determining whether the execution screen of the application is changed, and changing a graphic attribute of a soft key display region in response to changing the execution screen of the application.

According to various embodiments, the displaying of the execution screen of the application and the soft key may include identifying the graphic attribute of the execution screen of the application, determining a graphic attribute of the soft key display region based on the graphic attribute of the execution screen of the application, and displaying the execution screen of the application and the soft key based on the graphic attribute of the soft key.

According to various embodiments, the determining of the graphic attribute of the soft key display region may include determining whether the execution screen of the application overlaps with the soft key display region, determining a region for detecting the graphic attribute of the execution screen of the application based on whether the execution screen of the application overlaps with the soft key display region, and detecting the graphic attribute of the execution screen of the application from the determined region.

According to various embodiments, the determining of whether the execution screen of the application is changed may include determining that the execution screen of the application is changed if a scroll event occurs.

According to various embodiments, the changing of the graphic attribute of the soft key display region may include determining whether a scroll operation for the execution screen of the application is terminated, and restoring the graphic attribute of the soft key display region if the scroll operation for the execution screen of the application is terminated.

According to various embodiments, the changing of the graphic attribute of the soft key display region may include determining whether the graphic attribute of the execution screen of the application is changed when the graphic attribute of the soft key display region is restored, changing the graphic attribute of the soft key display region based on the graphic attribute of the execution screen of the application if the graphic attribute of the execution screen of the application is changed, and maintaining the graphic attribute of the soft key display region if the graphic attribute of the execution screen of the application is not changed.

According to various embodiments, the graphic attribute may include at least one of color, transparency, or brightness.

According to various embodiments, the changing of the graphic attribute of the soft key display region may include determining the graphic attribute of the soft key display region based on a change variable for the execution screen of the application.

According to various embodiments, the change variable may include at least one of a movement direction, movement speed, movement time, or movement distance of the execution screen of the application based on the scroll operation.

According to various embodiments, the method may further include identifying brightness of the soft key display region, and changing color of an icon corresponding to the soft key based on the brightness.

An electronic device and an operating method thereof according to various embodiments can efficiently utilize a touch screen by changing a graphic attribute of a soft key based on an execution screen of an application displayed on the touch screen of the electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), or a programmable-logic device for performing operations which has been known or are to be developed hereinafter.

According to various embodiments, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 120), may cause the one or more processors to execute the function corresponding to the instruction. The non-transitory computer-readable storage medium may be, for example, the memory 130.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touch-screen display; and
at least one processor configured to:
  control the touch-screen display to display an execution screen of an application, and a soft key display region including at least one soft key,
  determine whether the displayed execution screen of the application has changed,
  confirm a color graphic attribute of the execution screen of the application based on the determination that the execution screen of the application has changed,
  determine a color graphic attribute of the soft key display region based on the color graphic attribute of the execution screen of the application by:
    determining a size of the execution screen of the application compared to a reference size,
    determining a region for detecting the color graphic attribute of the execution screen of the application based on an overlapping region of the execution screen of the application with the soft key display region if the determined size of the execution screen of the application is greater than or equal to the reference size,
    determining a region adjacent to the soft key display region for detecting the color graphic attribute of the execution screen of the application if the determined size of the execution screen of the application is less than the reference size, and
    detecting the color graphic attribute of the execution screen of the application from the determined region,
  if the determined size of the execution screen of the application is greater than or equal to the reference size, control the touch-screen display to change a transparency graphic attribute of the soft key display region and display the execution screen of the application and the soft key display region in an overlapping manner based on the color graphic attribute of the soft key display region, and if the determined size of the execution screen of the application is less than the reference size, control the touch-screen display to set the color graphic attribute of the soft key display region based on the color graphic attribute of the execution screen of the application and display the execution screen of the application and the soft key display region in a separated manner based on the color graphic attribute of the soft key display region, wherein the displayed execution screen of the application is determined to be changed based on at least one of a scrolling of the execution screen of the application, an overlapping of the execution screen and the soft key display region, or a hiding of the soft key display region.

2. The electronic device of claim 1, wherein, when the scrolling of the execution screen of the application is occurred, the at least one processor is further configured to:

determine whether the scrolling of the execution screen of the application is terminated; and control the touch-screen display to restore the color graphic attribute of the soft key display region based on the scrolling of the execution screen of the application being terminated.

3. The electronic device of claim 2, wherein the at least one processor is further configured to:

determine whether the color graphic attribute of the execution screen of the application is changed when the color graphic attribute of the soft key display region is restored;

control the touch-screen display to change the color graphic attribute of the soft key display region based on the color graphic attribute of the execution screen of the application based on the color graphic attribute of the execution screen of the application being changed; and control the touch-screen display to maintain the color graphic attribute of the soft key display region based on the color graphic attribute of the execution screen of the application not being changed.

4. The electronic device of claim 1, wherein the at least one processor is further configured to determine the color graphic attribute of the soft key display region based on a change variable for the execution screen of the application.

5. The electronic device of claim 4, wherein, when the scrolling of the execution screen of the application occurs, the change variable comprises at least one of a movement direction, a movement speed, a movement time, or a movement distance of the execution screen of the application based on the scrolling of the execution screen of the application.

6. The electronic device of claim 1, wherein the at least one processor is further configured to:

identify brightness of the soft key display region; and control the touch-screen display to change color of an icon corresponding to the at least one soft key based on the brightness.

7. A method of operating an electronic device, the method comprising:

displaying, in a touch-screen display an execution screen of an application, and a soft key display region including at least one soft key;

determining whether the displayed execution screen of the application has changed;

confirming a color graphic attribute of the execution screen of the application based on the determination that the execution screen of the application has changed;

determining a color graphic attribute of the soft key display region based on the color graphic attribute of the execution screen of the application; and displaying the execution screen of the application and the soft key display region based on the color graphic attribute of the soft key display region, wherein the determining of the color graphic attribute of the soft key display region comprises:

determining a size of the execution screen of the application compared to a reference size, if the determined size of the execution screen of the application is greater than or equal to the reference size, determining a region for detecting the color graphic attribute of the execution screen of the application based on an overlapping region of the execution screen of the application with the soft key display region, if the determined size of the execution screen of the application is less than the reference size, determining a region adjacent to the soft key display region for detecting the color graphic attribute of the execution screen of the application, and detecting the color graphic attribute of the execution screen of the application from the determined region, wherein the displaying of the execution screen of the application and the soft key display region comprises:

if the determined size of the execution screen of the application is greater than or equal to the reference size, changing a transparency graphic attribute of the soft key display region and displaying the execution screen of the application and the soft key display region in an overlapping manner, and if the determined size of the execution screen of the application is less than the reference size, setting the color graphic attribute of the soft key display region based on the color graphic attribute of the execution screen of the application and displaying the execution screen of the application and the soft key display region in a separated manner, and wherein the displayed execution screen of the application is determined to be changed based on at least one of a scrolling of the execution screen of the application, an overlapping of the execution screen and the soft key display region, or a hiding of the soft key display region.

8. The method of claim 7, when the scrolling of the execution screen of the application is occurred, further comprising:

determining whether the scrolling of the execution screen of the application is terminated; and restoring the color graphic attribute of the soft key display region based on the scrolling of the execution screen of the application being terminated.

9. The method of claim 8, further comprising:

determining whether the color graphic attribute of the execution screen of the application is changed when the color graphic attribute of the soft key display region is restored;

changing the color graphic attribute of the soft key display region based on the color graphic attribute of the execution screen of the application based on the color graphic attribute of the execution screen of the application being changed; and maintaining the color graphic attribute of the soft key display region based on the color graphic attribute of the execution screen of the application not being changed.

10. The method of claim 7, wherein the determining of the color graphic attribute of the soft key display region comprises determining the color graphic attribute of the soft key display region based on a change variable for the execution screen of the application.

11. The method of claim 10, wherein, when the scrolling of the execution screen of the application is occurred, the change variable comprises at least one of a movement direction, a movement speed, a movement time, or a movement distance of the execution screen of the application based on the scrolling of the execution screen of the application.

12. A non-transitory computer-readable storage medium configured to store one or more computer instructions, that when executed by at least one processor, cause the at least one processor to:
- control a touch-screen display to display an execution screen of an application, and a soft key display region including a soft key;
- determine whether the displayed execution screen of the application has changed;
- confirm a color graphic attribute of the execution screen of the application based on the determination that the execution screen of the application has changed;
- determine a color graphic attribute of the soft key display region based on the color graphic attribute of the execution screen of the application by:
  - determining a size of the execution screen of the application compared to a reference size,
  - determining a region for detecting the color graphic attribute of the execution screen of the application based on an overlapping region of the execution screen of the application with the soft key display region if the determined size of the execution screen of the application is greater than or equal to the reference size,
  - determining a region adjacent to the soft key display region for detecting the color graphic attribute of the execution screen of the application if the determined size of the execution screen of the application is less than the reference size, and
  - detecting the color graphic attribute of the execution screen of the application from the determined region;
- if the determined size of the execution screen of the application is greater than or equal to the reference size, control the touch-screen display to change a transparency graphic attribute of the soft key display region and display the execution screen of the application and the soft key display region in an overlapping manner based on the color graphic attribute of the soft key display region; and
- if the determined size of the execution screen of the application is less than the reference size, control the touch-screen display to set the color graphic attribute of the soft key display region based on the color graphic attribute of the execution screen of the application and display the execution screen of the application and the soft key display region in a separated manner based on the color graphic attribute of the soft key display region,
wherein the displayed execution screen of the application is determined to be changed based on at least one of a scrolling of the execution screen of the application, an overlapping of the execution screen and the soft key display region, or a hiding of the soft key display region.

* * * * *